(12) United States Patent
Beidas

(10) Patent No.: US 8,467,438 B2
(45) Date of Patent: Jun. 18, 2013

(54) SYSTEM AND METHOD FOR ITERATIVE NONLINEAR COMPENSATION FOR INTERMODULATION DISTORTION IN MULTICARRIER COMMUNICATION SYSTEMS

(76) Inventor: Bassel F. Beidas, Alexandria, VA (US)

(*) Notice: Subject to any disclaimer, the term of this patent is extended or adjusted under 35 U.S.C. 154(b) by 400 days.

(21) Appl. No.: 12/963,729

(22) Filed: Dec. 9, 2010

(65) Prior Publication Data

US 2012/0027070 A1 Feb. 2, 2012

Related U.S. Application Data

(60) Provisional application No. 61/369,852, filed on Aug. 2, 2010.

(51) Int. Cl.
*H03H 7/30* (2006.01)
*H03H 7/40* (2006.01)
*H03K 5/159* (2006.01)

(52) U.S. Cl.
USPC ........... 375/229; 375/340; 375/346; 375/144; 375/148; 375/341; 375/350; 714/786

(58) Field of Classification Search
USPC ................. 375/229, 340, 346, 144, 148, 341, 375/350; 714/786
See application file for complete search history.

(56) References Cited

U.S. PATENT DOCUMENTS

| | | | | |
|---|---|---|---|---|
| 6,671,338 B1 * | 12/2003 | Gamal et al. | ........... | 375/346 |
| 7,027,533 B2 * | 4/2006 | Abe et al. | ........... | 375/341 |
| 7,215,704 B2 * | 5/2007 | Fujii et al. | ........... | 375/232 |
| 7,979,775 B2 * | 7/2011 | Yu et al. | ........... | 714/755 |
| 8,331,511 B2 * | 12/2012 | Beidas et al. | ........... | 375/349 |
| 8,355,462 B2 * | 1/2013 | Beidas et al. | ........... | 375/296 |
| 2002/0161560 A1 * | 10/2002 | Abe et al. | ........... | 702/196 |
| 2005/0128966 A1 * | 6/2005 | Yee | ........... | 370/310 |
| 2006/0078075 A1 * | 4/2006 | Stamoulis et al. | ........... | 375/346 |
| 2009/0103666 A1 * | 4/2009 | Zhao et al. | ........... | 375/341 |
| 2010/0050048 A1 | 2/2010 | Djordjevic et al. | | |
| 2010/0183106 A1 | 7/2010 | Beidas et al. | | |

FOREIGN PATENT DOCUMENTS

WO WO 2007/055533 A1 5/2007

OTHER PUBLICATIONS

European Search Report for European Application No. 11178060.7 dated Oct. 17, 2011, pp. 1-7.

* cited by examiner

*Primary Examiner* — Kenneth Lam
*Assistant Examiner* — Sung Ahn
(74) *Attorney, Agent, or Firm* — Potomac Technology Law

(57) ABSTRACT

A receiver is provided that can receive a first signal transmitted on a first carrier and a second signal transmitted on a second carrier. The receiver includes a channel estimation portion, a multicarrier nonlinear equalizer, a first log likelihood computing portion and a second log likelihood computing portion. The channel estimation portion can output a first estimation. The multicarrier nonlinear equalizer can output a first equalized signal and a second equalized signal. The first log likelihood ratio computing portion can output a first log likelihood ratio signal based on the first equalized signal. The second log likelihood ratio computing portion can output a second log likelihood ratio signal based on the second equalized signal. The multicarrier nonlinear equalizer can further output a third equalized signal and a fourth equalized signal. The third equalized signal is based on the first signal, the second signal and the first estimation. The fourth equalized signal is based on the first signal, the second signal and the first estimation.

18 Claims, 4 Drawing Sheets

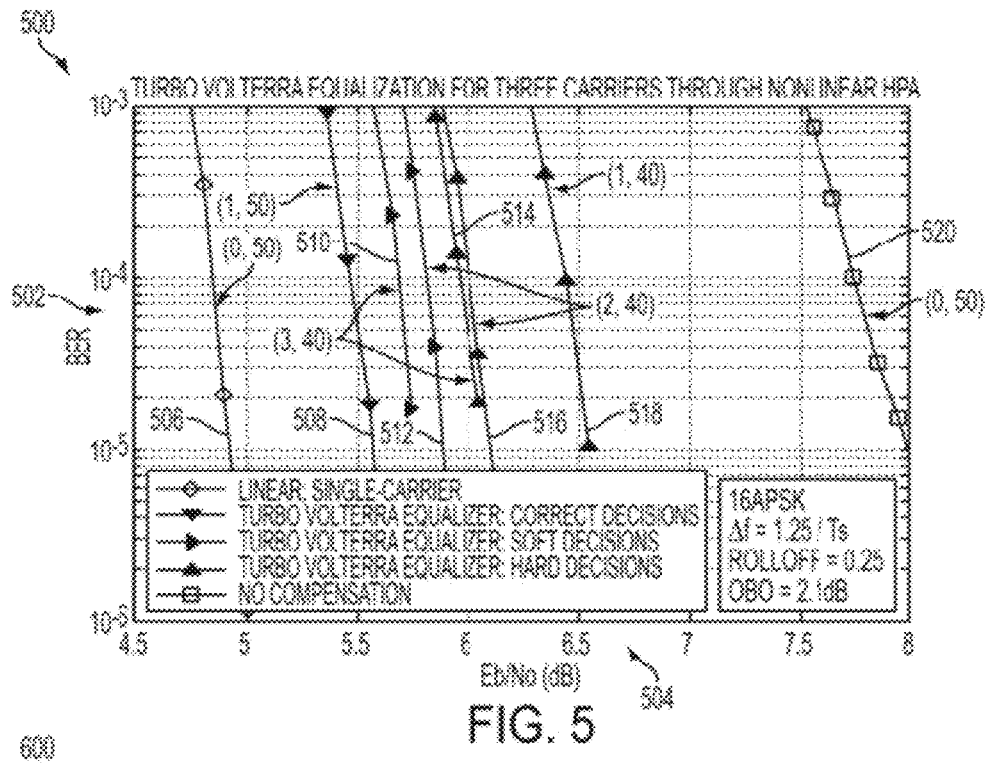

SYSTEM AND METHOD FOR ITERATIVE NONLINEAR COMPENSATION FOR INTERMODULATION DISTORTION IN MULTICARRIER COMMUNICATION SYSTEMS

The present application claims priority from U.S. Provisional Application No. 61/369,852 filed Aug. 2, 2010, the entire disclosure of which is incorporated herein by reference.

BACKGROUND

The present invention relates to the field of wireless communication systems, in particular, intermodulation distortion (IMD) in multicarrier communication systems.

Interference is an undesirable result of increasingly crowded spectrum in modern communication systems. When multiple carriers share the same transponder high power amplifier (HPA), the transponder HPA may transmit a maximum signal strength when operating near a saturation output power level. However, operating near saturation will increase non-linearities in the HPA. Any non-linearity in the HPA may lead to IMD, which causes interference within a message itself as well as between the message signals by transferring modulations from one frequency range to another. The problem is particularly acute when cost effective nonlinearized HPA is operated with minimal output back-off. Output back-off (OBO) is the amount (in dB) by which the output power level of the HPA is reduced, or "backed-off," from the saturation output power level. The problem is further compounded when the carriers passing through the HPA are bandwidth efficient, whose constellations include multiple concentric rings, and the carriers are tightly spaced within the limited spectrum.

IMD is the unwanted amplitude and phase modulation of signals containing two or more different frequencies in a system with nonlinearities. The intermodulation between each frequency component will form additional signals at frequencies that are not, in general, at harmonic frequencies (integer multiples) of either, but instead often at sum and difference frequencies of the original frequencies. The spurious signals, which are generated due to the nonlinearity of a system, are mathematically related to the original input signals. When the spurious signals are of sufficient amplitude, they can cause interference within the original system or in other systems, and, in extreme cases, loss of transmitted information, such as voice, data or video.

Broadband systems may be affected by all the nonlinear distortion products. Bandpass filtering can be an effective way to eliminate most of the undesired products without affecting in-band performance. However, third order intermodulation products are usually too close to the fundamental signals and cannot be easily filtered. The amplitude and phase distortion is unacceptable in systems that use higher order modulation schemes, because the distortion results in an error component in the received vector, degrading the receiver's bit error rate (BER).

FIG. 1 illustrates a conventional multicarrier communication system 100.

As illustrated in the figure, conventional multicarrier communication system 100 includes a plurality of transmitting sources and corresponding receiver front ends. Conventional multicarrier communication system 100 includes transmitting sources 102 and 104, however, there may be $M_c$ independent carriers transmitting binary data. Additionally, conventional multicarrier communication system 100 includes receiver front ends 108 and 110, however, there may be $M_c$ receiver front ends. Conventional multicarrier communication system 100 further includes an adder 136, a nonlinear transponder high power amplifier (HPA) 106 and an adder 138. Adder 138 models the additive white Gaussian noise i.e. AWGN. Adder 138 can be thought of as the channel, but is grouped in with HPA 106 for convenience.

Transmitting source 102 includes a bit source 112 a forward error correction (FEC) encoder 114, an interleaver 116, a gray-coded APSK modulator 118, a transmit filter 120 and a mixer 122. Transmitting source 104 includes a bit source 124, an FEC encoder 126, an interleaver 128, a gray-coded APSK modulator 130, a transmit filter 132 and a mixer 134.

Receiver frond-end 108 includes a mixer 140, a receive filter 142 and a sampling switch 144. Receiver frond-end 110 includes a mixer 146, a receive filter 148 and a sampling switch 150.

In FIG. 1, each of bit source 112, FEC encoder 114, interleaver 116, gray-coded APSK modulator 118, transmit filter 120, mixer 122, bit source 124, FEC encoder 126, interleaver 128, gray-coded APSK modulator 130, transmit filter 132, mixer 134, HPA 106, mixer 140, receive filter 142, sampling switch 144, mixer 146, receive filter 148 and sampling switch 150 are illustrated as distinct devices. However, at least two of bit source 112, FEC encoder 114, interleaver 116, gray-coded APSK modulator 118, transmit filter 120 and mixer 122 may be combined as a unitary device. Similarly, at least two of bit source 124, FEC encoder 126, interleaver 128, gray-coded APSK modulator 130, transmit filter 132 and mixer 134 may be combined as a unitary device. Similarly, at least two of mixer 140, receive filter 142, sampling switch 144 or one of mixer 146, receive filter 148 and sampling switch 150 may be combined as a unitary device.

Bit source 112 is operable to provide information data bits signal 152 for transmitting source 102 to FEC encoder 114. Non-limiting examples for bit source 112 include a source of data, images, video, audio, etc.

FEC encoder 114 is operable to receive information data bits signal 152 and provide encoded data bits signal 154 to interleaver 116. FEC encoder 114 provides forward error correction by adding redundancy to information data bits signal 152. Forward error correction improves the capacity of a channel by adding some carefully designed redundant information to the data being transmitted through the channel.

Interleaver 116 is operable to scramble the encoded data bits signal 154 by rearranging the bit sequence in order to make the distortion at the receiver more independent from bit to bit. Interleaving is a process of rearranging the ordering of a data sequence in a one to one deterministic format. Interleaving is used to enhance the error correcting capability of coding.

Gray-coded APSK modulator 118 is operable to modulate interleaved bits signal 156 to complex-valued data symbols 158, which follow two-dimensional constellation using Amplitude Phase Shift Keying (APSK). In this embodiment of multicarrier communication system 100 gray-coded APSK modulator is used, however, other modulation types may be used. For alphabet size M, complex-valued data symbols 158 generated by gray-coded APSK modulator 118 at the symbol rate of $T_s^{-1}$ can be represented by $\{a_{m,k}; m=1, 2, \ldots, M_c\}_{k=-\infty}^{\infty}$.

Transmit filter 120 is operable to convert complex-valued data symbols 158 to a waveform signal 160 using a pulse shaping function with an impulse response $p_{1,T}$.

Mixer 122 is operable to mix waveform signal 160 with signal 162 to assign it an appropriate carrier frequency slot for transmitting. For transmitting source 102, signal 154 may be represented as $e^{j(2\pi f_1 t + \theta_1)}/\sqrt{M_c}$.

For transmitting source 104, bit source 124, FEC encoder 126, interleaver 128 and gray-coded APSK modulator 130 operate in the similar manner as described above for transmitting source 102. However, transmit filter 132 is operable to generate a waveform signal 166 using a pulse shaping function with an impulses response $p_{M_c,T}$.

Mixer 134 is operable to mix waveform signal 166 with signal 168 to assign it another appropriate carrier frequency slot for transmitting. For transmitting source 104, signal 168 is represented as $e^{j(2\pi f_{M_c}t+\theta_{M_c})}/\sqrt{M_c}$.

Adder 136 is operable to add output signals from different transmitting sources and provide a composite signal 172 to HPA 106. In FIG. 1, adder 136 is shown to add output signal 164 from transmitting source 102 and output signal 170 from transmitting source 104, however, there may be more output signals from other carriers going to adder 136 to generate composite signal 172. Composite signal 172 at the transmitter output can be described in complex form as:

$$s_c(t) = \sum_{m=1}^{M_c} \frac{1}{\sqrt{M_c}} \cdot s_m(t) \cdot e^{j(2\pi f_m t + \theta_m)}, \tag{1}$$

where individual waveform $s_m(t)$, as represented by waveform signal 160 (for m=1) or waveform signal 166 (for m=$M_c$), are digitally modulated, and given by:

$$s_m(t) = \sum_{k=-\infty}^{\infty} a_{m,k} \cdot p_{m,T}(t - kT_s - \epsilon_m T_s), \tag{2}$$

$\{\epsilon_m, \theta_m\}$ represents normalized difference in signal arrival time and carrier phase, respectively, and $f_m$ is the mth center frequency. In equation (2), $p_{m,T}(t)$ is the impulse response of transmit filter 120 (for m=1). It more generally models the cascade of pulse shaping filter and on-board input multiplexing filter.

For better utilization of bandwidth, the case of uniform spacing in frequency, say $\Delta f$, is considered, alternatively $$f_m = \left(m - \frac{M_c+1}{2}\right) \cdot \Delta f; m = 1, 2, \ldots, M_c. \tag{3}$$

However, the analysis presented here is applicable to any other frequency plan.

HPA 106 is operable to receive composite signal 172 and provide an amplified nonlinear composite signal 174, represented by $s_{NL}(t)$, to be transmitted through a communication link, for example, a satellite system. HPA 106 is modeled as a nonlinear memory-less device, whose input-output relationship can be expressed as a power series:

$$s_{NL}(t) = \sum_{l=0}^{\infty} \gamma^{(2l+1)} \cdot [s_c(t)]^{l+1} \cdot [s_c^*(t)]^l, \tag{4}$$

where $\{\gamma^{(2l+1)}\}$ is a set of complex valued coefficients that accounts for Amplitude-to-Amplitude Modulation (AM/AM) and Amplitude-to-Phase Modulation (AM/PM) distortions. The absence of even order product terms in equation (4) is due to the bandpass nature of the nonlinearity which produces contribution that is outside the frequency band of interest.

Adder 138 is modeled to add amplified nonlinear composite signal 174 to AWGN, represented by n(t), with single sided power spectral density of $N_0$ (Watts/Hz) represented by a signal 176 such that a receiver front end input signal 178, represented by r(t), can be expressed as:

$$r(t) = s_{NL}(t) + n(t). \tag{5}$$

Each receiver front end includes a receive filter to frequency translate each carrier to baseband and to apply a filtering operation with impulse response $p_{m,R}(t)$ so that the noise is rejected in the non-signal band. For receiver front end 108, mixer 140 is operable to mix received signal 178 with a signal 180 to adjust the amplitude and also remove the frequency component added by transmitting source 102. Signal 180 can be represented as $\sqrt{M_c} e^{-j(2\pi f_1 t+\theta_1)}$.

Receive filter 142 is operable to apply a filtering operation with impulse response $p_{1,R}(t)$ on a waveform signal 182 such that the noise is rejected in the non-signal band. The input-output relationship of the mth receive filter bank can be expressed as:

$$x_m(t) = \int_{-\infty}^{\infty} r(t-\tau) \sqrt{M_c} \, e^{-j(2\pi f_m(t-\tau)+\theta_m)} \cdot p_{m,R}(\tau) d\tau. \tag{6}$$

More generally, receive filter $p_{m,R}(t)$ models the cascade of a matched filter and an on board output multiplexing filter, collectively referred here as a receive filter bank. Each of receiver front end 108 and 110 is sometimes referred as a branch of receive filter bank in this application. Further, outputs of the receive filter bank are sampled at the symbol rate to produce $x_m((n+\epsilon_m)T_s)$; m=1, 2, ... $M_c$. For receiver front end 108, an output waveform 184 of receive filter 142 is sampled at the symbol rate by sampling switch 144 to produce a receive sample signal 186, represented by $x_1((n+\epsilon_1)T_s)$.

Operation of receiver front end 110 is similar to 108, where an output waveform 190 of receive filter 148 is sampled at the symbol rate by sampling switch 150 to produce a receive sample signal 194, represented by $x_{M_c}((n+\epsilon_{M_c})T_s)$.

As discussed above with reference to FIG. 1, due to multiple carriers sharing same transponder HPA 106, $x_1 \ldots x_{M_c}$ contain high levels of interference or IMD as a result of the nonlinear impact, filtering and the proximity of the signals. Since the composite of these high-order modulation carriers suffers from large amplitude fluctuations, severe level of IMD among carriers can be generated causing unacceptable performance degradation.

What is needed is a system and method to provide nonlinear compensation for IMD in multicarrier communication systems, where multiple carriers share the same transponder HPA.

BRIEF SUMMARY

The present invention provides a system and method to overcome IMD in multicarrier communication systems, which utilizes a turbo nonlinear equalizer that is capable of reconstructing IMD, and then compensating for it using linear MMSE criterion. The term "turbo," when used to modify an equalizer, means that there are iterations and that there is an exchange of soft information between a decoder and an equalizer. A multicarrier nonlinear series based formulations, which is of the modular type, is established to reconstruct and evaluate nonlinear IMD. The proposed multicarrier nonlinear equalizer is adaptive as it Utilizes estimates of the generalized nonlinear kernels, obtained by RLS channel estimation at the end of pilot-based training. This allows for compensation that does not require prior knowledge of the HPA characteristics and can be rapidly responsive to variations in the environment.

In accordance with an aspect of the present invention, a receiver is provided that can receive a first signal transmitted on a first carrier and a second signal transmitted on a second carrier. The receiver includes a channel estimation portion, a multicarrier nonlinear equalizer, a first log likelihood computing portion and a second log likelihood computing portion. The channel estimation portion can output a first estimation. The multicarrier nonlinear equalizer can output a first equalized signal and a second equalized signal. The first log likelihood ratio computing portion can output a first log likelihood ratio signal based on the first equalized signal. The second log likelihood ratio computing portion can output a second log likelihood ratio signal based on the second equalized signal. The multicarrier nonlinear equalizer can further output a third equalized signal and a fourth equalized signal. The third equalized signal is based on the first signal, the second signal and the first estimation. The fourth equalized signal is based on the first signal, the second signal and the first estimation.

Additional advantages and novel features of the present invention are set forth in part in the description which follows, and in part will become apparent to those skilled in the art upon examination of the following or may be learned by practice of the present invention. The advantages of the present invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an example embodiment of the present invention and, together with the description, serve to explain the principles of the present invention. In the drawings:

FIG. 5 illustrates a graph for BER performance of a family of multicarrier Volterra equalizers with signal to noise ratio/bit ($E_b/N_o$) for 16APSK modulation when three carriers pass through a common HPA, in accordance with an aspect of the present invention;

FIG. 6 illustrates a graph for BER performance of a family of multicarrier Volterra equalizers with signal to noise ratio/bit ($E_b/N_o$) for 32APSK modulation when three carriers pass through a common HPA, in accordance with an aspect of the present invention;

DETAILED DESCRIPTION

The present invention provides a system and method to provide nonlinear compensation for IMD in multicarrier communication systems by employing a powerful turbo equalization method.

First, an analytical framework is presented, which characterizes the resulting IMD in multicarrier communication systems by utilizing a nonlinear series representation to model IMD for nonlinear behavior of the system, taking into consideration the memory within the carrier itself and those associated with other carriers. In an example embodiment, a Volterra series representation is used. However, any nonlinear series representation may be used, non-limiting examples of which include a Hammerstein model and a Wiener model. Also, an analytical evaluation of nonlinear IMD is presented, which involves computing statistical averages of higher-order products of Volterra series containing complex-valued symbols from multiple carriers.

Next, using this theoretical characterization, a novel method is presented to overcome IMD in highly distortion-limited environments by employing a powerful turbo equalization method with linear minimum mean-squared criterion. Further, the solution is adaptive with pilot-based training so compensation does not require prior knowledge of the HPA characteristics and can be rapidly responsive to variations in the environment. Through extensive simulations, it is shown that the proposed multicarrier analysis and turbo Volterra techniques can be used to substantially remove IMD resulting from operating the nonlinear transponder HPA, shared by multiple carriers, near saturation. By applying more iterations of joint equalization and decoding, the solution can approach the ideal performance when feeding back correct decisions.

Figure 1:
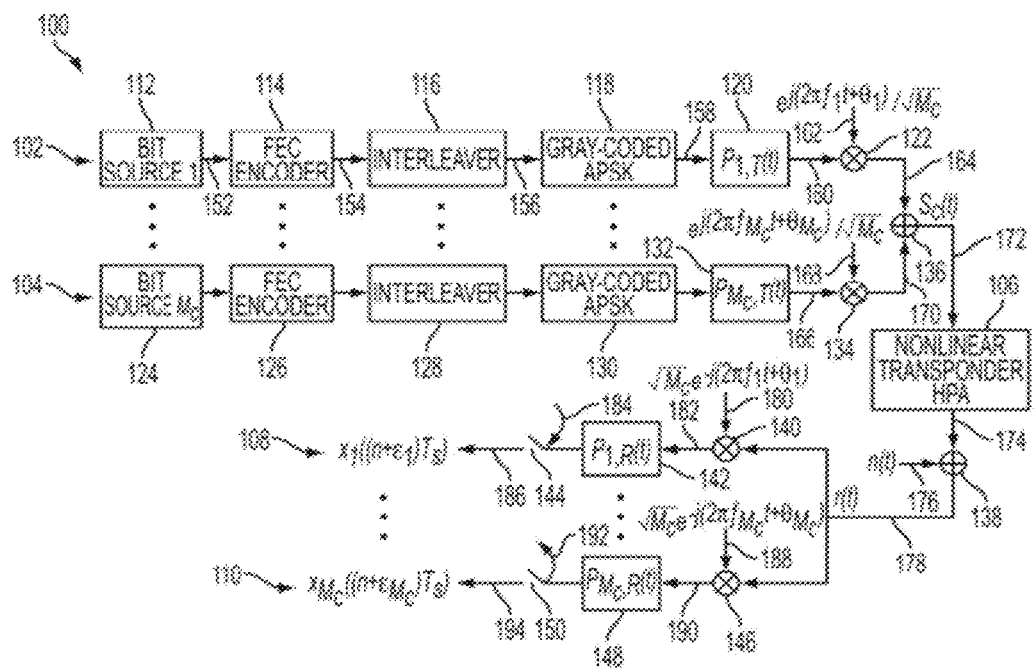
FIG. 1 illustrates a conventional multicarrier communication system.

For system model as described with reference to FIG. 1, third-order IMD at the receive filter bank is analyzed based on multicarrier Volterra representation, resulting when a single nonlinear transponder. HPA 106 is utilized by multiple FEC-encoded high-order modulation carriers. Here, the Volterra representation is merely an example used for purposes of explanation. However, any nonlinear series representation may be used, non-limiting examples of which include a Hammerstein model and a Wiener model. Additionally, the amount of resulting nonlinear distortion among carriers is analytically quantified as discussed below.

Considering $m_d$ to be a specific branch of receive filter bank and $z_{m_d}^{(3)}(t)$ be its waveform prior to the filtering operation, which is due to the third-order term in the power series representation of the nonlinearity in equation (4), then $z_{m_d}^{(3)}(t)$ can be expressed as:

$$z_{m_d}^{(3)}(t) = \gamma^{(3)} \cdot \sqrt{M_c}\, e^{-j(2\pi f_{m_d} t + \theta_{m_d})} \cdot [s_c(t) \cdot s_c(t) \cdot s_c^*(t)]. \quad (7)$$

$z_{m_d}^{(3)}(t)$ can be represented by waveform signal 182 (for and $m_d=1$). Substituting equation (1) in equation (7) and rearranging terms yields:

$$\zeta_{m_d}^{(3)}(t) = \frac{\gamma^{(3)}}{M_c} \cdot \sum_{m_1=1}^{M_c} \sum_{m_2=m_1}^{M_c} \sum_{m_3=1}^{M_c} 2^{1-\delta_{m_1 m_2}} \cdot s_{m_1}(t) \cdot s_{m_2}(t) \cdot \qquad (8)$$
$$s_{m_3}^*(t) \cdot e^{j(2\pi(f_{m_1}+f_{m_2}-f_{m_3}-f_{m_d})t+(\theta_{m_1}+\theta_{m_2}-\theta_{m_3}-\theta_{m_d}))},$$

where $\delta_{ij}$ is the Kroenecker Delta function, equal to unity if i=j and zero otherwise. By substituting equation (8) into equation (6), the third-order contribution of the nonlinearity to the receive filter bank, $\zeta_{m_d}^{(3)}((n+\epsilon_{m_d})T_s)$, is expressed as $$\zeta_{m_d}^{(3)}((n+\epsilon_{m_d})T_s) = \int_{-\infty}^{\infty} z_{m_d}^{(3)}((n+\epsilon_{m_d})T_s - \tau) \cdot p_{m_d,R}(\tau) d\tau. \qquad (9)$$

The effective channel impulse response of IMD may be expressed in terms of the generalized definition of Volterra kernels, as $$h_{bcde}^{(3)}(t_1, t_2, t_3; f_o) \overset{\Delta}{=} \qquad (10)$$
$$\int_{-\infty}^{\infty} p_{b,T}(t_1 - \tau) \cdot p_{c,T}(t_2 - \tau) \cdot p_{d,T}^*(t_3 - \tau) \cdot p_{e,R}(\tau) \cdot e^{-j2\pi f_o \tau} d\tau,$$

where $1 \leq b, c, d, e \leq M_c$. Note that in this generalized definition, there are four subscripts to denote three transmit filters involved in the third-order product as well as the receive filter. Also, there is a dependency on the frequency parameter $f_o$, which is a function of the spacing between carriers. To expose the significant role of $f_o$, the generalized Volterra kernel in equation (10) is equivalently expressed in the frequency domain, by using properties of Fourier transforms, as $$h_{bcde}^{(3)}(t_1, t_2, t_3; f_o) = \int_{-\infty}^{\infty} \left[ P_{b,T}(f - f_o) e^{j2\pi(f-f_o)t_1} \underset{f}{*} P_{c,T}(f - f_o) \right] \qquad (11)$$
$$e^{j2\pi(f-f_o)t_2} \underset{f}{*} P_{d,T}^*(-(f - f_o)) e^{j2\pi(f-f_o)t_3} \right] \cdot P_{e,R}(f) df,$$

where $\overset{\star}{f}$ denotes the convolution operator in the frequency domain. The bracketed term in equation (11) represents the IMD term, resulting from the third-order product and is as wide in frequency as the sum of the widths of individual transmit pulses, because of the convolution operation. In addition, this IMD term is centered at $f_o$ relative to the receive filter, $P_{e,R}(f)$, which is centered at the origin. Fortunately, this contribution diminishes rapidly when $|f_o| > \Delta f$ for practical bandwidth efficient choices of transmit and receive filters.

Based on equations (8)-(11), few important observations can be made as described below.

Due to the presence of multiple carriers sharing the same nonlinearity, there exists multitude of terms of third-order IMD, for a total of $M_c^2(M_c+1)/2$ distinct terms. Each of these IMD terms appearing at the $m_d$-th branch when sampled at the symbol rate can be expressed as:

$$IMD_{m_d}^{(3)}([m_1 m_2 m_3]) = \qquad (12)$$
$$\frac{\gamma^{(3)}}{M_c} \cdot 2^{1-\delta_{m_1 m_2}} \cdot e^{j(2\pi(f_{m_1}+f_{m_2}-f_{m_3}-f_{m_d})(n+\epsilon_{m_d})T_s+(\theta_{m_1}+\theta_{m_2}-\theta_{m_3}-\theta_{m_d}))} .$$

-continued $$\sum_{k_1=-\infty}^{\infty} \sum_{k_2=-\infty}^{\infty} \sum_{k_3=-\infty}^{\infty} a_{m_1,n-k_1} \cdot a_{m_2,n-k_2} \cdot a_{m_3,n-k_3}^* \cdot$$
$$h_{m_1 m_2 m_3 m_d}^{(3)}((k_1 - \delta\epsilon_{m_1})T_s, (k_2 - \delta\epsilon_{m_2})T_s,$$
$$(k_3 - \delta\epsilon_{m_3})T_s; f_{m_1} + f_{m_2} - f_{m_3} - f_{m_d}),$$

where, $\delta\epsilon_{m_i} = \epsilon_{m_i} - \epsilon_{m_d}$, and $1 \leq m_1, m_2, m_3, m_d \leq M_c$. This suggests that the third-order IMD at the sampled receive filter output represents a discrete convolution of the interfering symbols with a three-dimensional impulse response quantified by the generalized Volterra kernel. These kernels are specified at a multiple factor of the carrier spacing, a factor that depends on the carrier combination $[m_1, m_2, m_3]$ at hand.

The IMD terms can be classified in terms of their frequency centers $f_o$ in equation (11). There are $3(M_c-1)+1$ centers of IMD spanning the range $$\begin{bmatrix} -\frac{3}{2}(M_c - 1) \cdot \Delta f - f_{m_d} \\ \left(-\frac{3}{2}(M_c - 1) + 1\right) \cdot \Delta f - f_{m_d} \\ \vdots \\ -\Delta f \\ 0 \\ +\Delta f \\ \vdots \\ \frac{3}{2}(M_c - 1) \cdot \Delta f - f_{m_d} \end{bmatrix}. \qquad (13)$$

The most significant terms are those with IMD that is frequency-centered at zero, achieved when the condition $f_{m_1} + f_{m_2} - f_{m_3} - f_{m_d} = 0$ is satisfied. The next set of significant IMD terms is centered at $\pm\Delta f$, achieved when the condition $f_{m_1} + f_{m_2} - f_{m_3} - f_{m_d} = \pm\Delta f$ is met. For equally-spaced carriers, the number of such distinct terms can be shown to be:

$$N_{m_d}(f_0) = \begin{cases} \frac{1}{4}(M_c^2 - (-1)^{m_d} \cdot M_c(\text{mod}2)) + & f_0 = 0 \\ \frac{1}{2}m_d(M_c - m_d + 1), & \\ \frac{1}{4}(M_c(M_c - 2) + (-1)^{m_d} \cdot M_c(\text{mod}2)) + & f_0 = -\Delta f \\ \frac{1}{2}(M_c m_d - (m_d - 1)(m_d - 2)), & \\ \frac{1}{4}(M_c(M_c + 2) + (-1)^{m_d} \cdot M_c(\text{mod}2)) + & f_0 = +\Delta f. \\ \frac{1}{2}m_d(M_c - m_d - 1), & \end{cases} \qquad (14)$$

Tables I and II, as described below, contain the carrier combinations $[m_1 m_2 m_3]$ that produce these terms for IMD centered at 0 and $\pm\Delta f$, respectively, when the number of carriers is 2, 3, 4 and 5, at each $m_d$-th branch of the filter bank; $1 \leq m_d \leq M_c$.

TABLE I

CARRIER COMBINATIONS THAT PRODUCE IMD THAT IS FREQUENCY-CENTERED AT ZERO FOR EQUALLY-SPACED MULTIPLE CARRIERS.

| | Receive Filter Branch | | | | |
|---|---|---|---|---|---|
| | $m_d = 1$ | $m_d = 2$ | $m_d = 3$ | $m_d = 4$ | $m_d = 5$ |
| $M_c = 2$ | [111] | [121] | — | — | — |
| | [122] | [222] | — | — | — |
| $M_c = 3$ | [111] | [121] | [131] | — | — |
| | [122] | [132] | [221] | — | — |
| | [133] | [222] | [232] | — | — |
| | [223] | [233] | [333] | — | — |
| $M_c = 4$ | [111] | [121] | [131] | [141] | — |
| | [122] | [132] | [142] | [231] | — |
| | [133] | [143] | [221] | [242] | — |
| | [144] | [222] | [232] | [332] | — |
| | [223] | [233] | [243] | [343] | — |
| | [234] | [244] | [333] | [444] | — |
| | — | [334] | [344] | — | — |
| $M_c = 5$ | [111] | [121] | [131] | [141] | [151] |
| | [122] | [132] | [142] | [152] | [241] |
| | [133] | [143] | [153] | [231] | [252] |
| | [144] | [154] | [221] | [242] | [331] |
| | [155] | [222] | [232] | [253] | [342] |
| | [223] | [233] | [243] | [332] | [353] |
| | [234] | [244] | [254] | [343] | [443] |
| | [245] | [255] | [333] | [354] | [454] |
| | [335] | [334] | [344] | [444] | [555] |
| | — | [345] | [355] | [455] | — |
| | — | — | [445] | — | — |

TABLE II

CARRIER COMBINATIONS THAT PRODUCE IMD THAT IS FREQUENCY-CENTERED AT $\pm \Delta f$ FOR EQUALLY-SPACED MULTIPLE CARRIERS.

| | Receive Filter Branch | | | | | | | | | |
|---|---|---|---|---|---|---|---|---|---|---|
| | $m_d = 1$ | | $m_d = 2$ | | $m_d = 3$ | | $m_d = 4$ | | $m_d = 5$ | |
| | $-\Delta f$ | $+\Delta f$ | $-\Delta f$ | $+\Delta f$ | $-\Delta f$ | $+\Delta f$ | $-\Delta f$ | $+\Delta f$ | $-\Delta f$ | $+\Delta f$ |
| $M_c = 2$ | [112] | [121] | [111] | [221] | — | — | — | — | — | — |
| | — | [222] | [122] | — | — | — | — | — | — | — |
| $M_c = 3$ | [112] | [121] | [111] | [131] | [121] | [231] | — | — | — | — |
| | [123] | [132] | [122] | [221] | [132] | [332] | — | — | — | — |
| | — | [222] | [133] | [232] | [222] | — | — | — | — | — |
| | — | [233] | [223] | [333] | [233] | — | — | — | — | — |
| $M_c = 4$ | [112] | [121] | [111] | [131] | [121] | [141] | [131] | [241] | — | — |
| | [123] | [132] | [122] | [142] | [132] | [231] | [142] | [331] | — | — |
| | [134] | [143] | [133] | [221] | [143] | [242] | [221] | [342] | — | — |
| | [224] | [222] | [144] | [232] | [222] | [332] | [232] | [443] | — | — |
| | — | [233] | [223] | [243] | [233] | [343] | [243] | — | — | — |
| | — | [244] | [234] | [333] | [244] | [444] | [333] | — | — | — |
| | — | [334] | — | [344] | [334] | — | [344] | — | — | — |
| $M_c = 5$ | [112] | [121] | [111] | [131] | [121] | [141] | [131] | [151] | [141] | [251] |
| | [123] | [132] | [122] | [142] | [132] | [152] | [142] | [241] | [152] | [341] |
| | [134] | [143] | [133] | [153] | [143] | [231] | [153] | [252] | [231] | [352] |
| | [145] | [154] | [144] | [221] | [154] | [242] | [221] | [331] | [242] | [442] |
| | [224] | [222] | [155] | [232] | [222] | [253] | [232] | [342] | [253] | [453] |
| | [235] | [233] | [223] | [243] | [233] | [332] | [243] | [353] | [332] | [554] |
| | — | [244] | [234] | [254] | [244] | [343] | [254] | [443] | [343] | — |
| | — | [255] | [245] | [333] | [255] | [354] | [333] | [454] | [354] | — |
| | — | [334] | [335] | [344] | [334] | [444] | [344] | [555] | [444] | — |
| | — | [345] | — | [355] | [345] | [455] | [355] | — | [455] | — |
| | — | — | — | [445] | — | [445] | — | — | — | — |

The accompanying noise term $n_m(t)$, $m=1, 2, \ldots, M_c$ at the receiver filter output is zero-mean additive colored complex-values Gaussian process with covariance $$\mathbb{E}\{n_m^*(t) \cdot n_{m'}(t')\} = \qquad (15)$$

$$N_0 \left[ \int_{-\infty}^{\infty} p_{m,R}^*(\alpha) \cdot p_{m',R}(\alpha + t' - t) \cdot e^{-j2\pi(f_{m'} - f_m)\alpha} d\alpha \right] \cdot$$
$$e^{-j(2\pi(f_{m'} - f_m)t' + (\theta_{m'} - \theta_m))}.$$

Next, an analytical performance evaluation of the IMD is provided as it appears at the receive filter output, where the performance is measured in terms of the MSE for a given desired data symbol, $a_{m_d,n}$. The MSE quantifies the amount of nonlinear distortion experienced at the receive filter output for the $m_d$-th branch normalized by the energy of the specific data symbol. More specifically, it is defined as:

$$MSE = \mathbb{E}\left\{ \left| a_{m_d,n} - \frac{x_{m_d}((n + \epsilon_{m_d})T_s)}{\gamma^{(1)} \cdot h_{m_d m_d}^{(1)}(0; 0)} \right|^2 \Big/ |a_{m_d,n}|^2 \right\} \qquad (16)$$

where $\gamma^{(1)}$ is the first-order power series coefficient in equation (4) and $h_{m_d m_d}^{(1)}(t; f)$ is the generalized first-order Volterra kernel. The evaluation of MSE requires computation of statistical moments of the products of Volterra series. The cross-correlation of the first-order terms has a form which contains two summations as:

Among the numerous terms in equation (8), there is one special summand that is associated with the condition $m_1 = m_2 = m_3 = m_d$. It can be alternatively described as nonlinear ISI and naturally has a frequency center of zero.

$$\sum_{k_1=-\infty}^{\infty}\sum_{k_2=-\infty}^{\infty}\mathbb{E} \quad (17)$$

$$\{a_{m_1,n-k_1}\cdot a^*_{m_2,n-k_2}\mid a_{m_d,n}\}\cdot h^{(1)}_{m_1 m_d}((k_1-\delta\epsilon_{m_1})T_s; f_{m_1}-f_{m_d})\cdot$$

$$\left(h^{(1)}_{m_2 m_d}((k_2-\delta\epsilon_{m_2})T_s; f_{m_2}-f_{m_d})\right)^*.$$

The cross-correlation of the third-order terms, as represented by equation (12), has a form, which contains six summations as:

$$\sum_{k_1=-\infty}^{\infty}\sum_{k_2=-\infty}^{\infty}\sum_{k_3=-\infty}^{\infty}\sum_{k_4=-\infty}^{\infty}\sum_{k_5=-\infty}^{\infty}\sum_{k_6=-\infty}^{\infty}\mathbb{E} \quad (18)$$

$$\{a_{m_1,n-k_1}a_{m_2,n-k_2}a_{m_6,n-k_6}\cdot a^*_{m_4,n-k_4}a^*_{m_5,n-k_5}a^*_{m_3,n-k_3}\mid$$

$$a_{m_d,n}\}\cdot h^{(3)}_{m_1 m_2 m_3 m_d}((k_1-\delta\epsilon_{m_1})T_s,(k_2-\delta\epsilon_{m_2})T_s,$$

$$(k_3-\delta\epsilon_{m_3})T_s; f_{m_1}+f_{m_2}-f_{m_3}-f_{m_d})\cdot$$

$$\left(h^{(3)}_{m_4 m_5 m_6 m_d}((k_4-\delta\epsilon_{m_4})T_s,(k_5-\delta\epsilon_{m_5})T_s,\right.$$

$$\left.(k_6-\delta\epsilon_{m_6})T_s; f_{m_4}+f_{m_5}-f_{m_6}-f_{m_d})\right)^*.$$

For accurate computation of the MSE, there is a need to incorporate the correlation that exists between first-order and third-order interference terms, which has a form containing four summations as:

$$\sum_{k_1=-\infty}^{\infty}\sum_{k_2=-\infty}^{\infty}\sum_{k_3=-\infty}^{\infty}\sum_{k_4=-\infty}^{\infty}\mathbb{E}\{a_{m_1,n-k_1}a_{m_4,n-k_4}\cdot a^*_{m_2,n-k_2}a^*_{m_3,n-k_3}\mid a_{m_d,n}\}\cdot \quad (19)$$

$$h^{(1)}_{m_1 m_d}((k_1-\delta\epsilon_{m_1})T_s, f_{m_1}-f_{m_d})\cdot$$

$$\left(h^{(3)}_{m_2 m_3 m_4 m_d}((k_2-\delta\epsilon_{m_2})T_s,(k_3-\delta\epsilon_{m_3})T_s,(k_4-\delta\epsilon_{m_4})T_s;\right.$$

$$\left.f_{m_2}+f_{m_3}-f_{m_4}-f_{m_d})\right)^*.$$

In order to evaluate equations (17)-(19), there is a need to compute the statistical average of products of random complex-valued data symbols used by the different carriers such as:

$$a_{m_1,k_1}a_{m_2,k_2}\ldots a_{m_p,k_p}\cdot a^*_{m_{p+1},k_{p+1}}a^*_{m_{p+2},k_{p+2}}\ldots a^*_{m_q,k_q} \quad (20)$$

These statistical averages can be computed by generalizing a conventional method to the situation of multiple carriers and when the signal constellations use multiple concentric rings as follows.

Let $v_{m,i}$ be the number of indices of the mth data symbol stream $a_{m,k_j}$ taking on the value i, and let $v^*_{m,i}$ be the number of indices of the conjugate of the With data symbol stream $a^*_{m,k_j}$ when it takes on the value i. It is assumed that all the time indices fall in the truncated range of integers [n−(L−1)/2, ... , n+(L−1)/2], where L is the effective double-sided memory length of the IMD channel response. Also, data streams are assumed independent across carriers and across symbols. Thus, the statistical average can be computed as:

$$\mathbb{E}\{a_{m_1 k_1}a_{m_2,k_2}\ldots a_{m_p,k_p}\cdot a^*_{m_{p+1},k_{p+1}}a^*_{m_{p+2},k_{p+2}}\ldots a^*_{m_q,k_q}\mid a_{m_d,n}\}= \quad (21)$$

$$a_{m_d,n}^{v_{m_d,n}}\left(a^*_{m_d,n}\right)^{v^*_{m_d,n}}\cdot$$

$$\prod_{\substack{i=n-(L-1)/2\\i\neq n}}^{n+(L-1)/2}\mathbb{E}\{a_{m_d,i}^{v_{m_d,i}}\left(a^*_{m_d,i}\right)^{v^*_{m_d,i}}\}\cdot\prod_{\substack{m=1\\m\neq m_d}}^{M_c}\prod_{i=n-(L-1)/2}^{n+(L-1)/2}\mathbb{E}\{a_{m,i}^{v_{m,i}}\left(a^*_{m,i}\right)^{v^*_{m,i}}\}.$$

By considering the data constellation to include M points distributed amongst $M_r$ concentric rings with uniformly spaced PSK points, the statistical expectations on the right-hand side of equation (21) can be computed as:

$$\mathbb{E}\{a_{m,i}^{v_{m,i}}\left(a^*_{m,i}\right)^{v^*_{m,i}}\}= \quad (22)$$

$$\frac{1}{M}\sum_{l=1}^{M_r}\rho_l^{(v_{m,i}+v^*_{m,i})}\cdot e^{j\left(\pi\frac{(n_l-1)}{n_l}+\phi_l\right)(v_{m,i}-v^*_{m,i})}\cdot\chi(n_l,v_{m,i}-v^*_{m,i})$$

where $n_1$, $\rho_1$ and $\phi_1$ are the number of points, the radius and the relative phase shift associated with the lth ring, respectively. In equation (22), the third term is defined as:

$$\chi(n_l,v_{m,i}-v^*_{m,i})\overset{\Delta}{=}n_l\cdot\frac{\cos(\pi\cdot(v_{m,i}-v^*_{m,i}))}{\cos\left(\pi\cdot\frac{(v_{m,i}-v^*_{m,i})}{n_l}\right)} \quad (23)$$

if $|v_{m,i}-v^*_{m,i}|$ is an integer multiple of $n_1$ and zero otherwise.

Finally, an application of these techniques is demonstrated in providing analytical performance evaluation in terms of MSE of distortion using FIGS. 2-3 below. As an example, each carrier is modulated by 16APSK with frequency spacing $\Delta f$ of values $1.25\,T_s^{-1}$, $1.13\,T_s^{-1}$ and $1.10\,T_s^{-1}$. The transmit and receive filters $p_{m,T}(t)$ and $p_{m,R}(t)$, with reference to FIG. 1, are a matched pair of root-raised cosine (RRC) filter with a roll-off factor of 0.25. As an example, in order to simplify the analysis, the nonlinearity of equation (4) is considered as containing only third-order components, or $y=x+\gamma^{(3)}\cdot x\cdot|x|^2$. However, a more general model of the nonlinearity is used for performance evaluation, as will be discussed later with reference to equation (54). The MSE of distortion, as quantified by equations (16)-(23), is displayed in FIGS. 2 and 3 versus the third-order parameter $\gamma^{(3)}$ for the center carrier, when the number of carriers is three and four respectively. The carrier combinations considered in the computation of MSE are those that produce IMD centered at zero and $\pm\Delta f$, listed in Tables I and II, respectively. Also displayed are Monte-Carlo simulations, marked by '□', at some selected value of $\gamma^{(3)}$.

Figure 2:
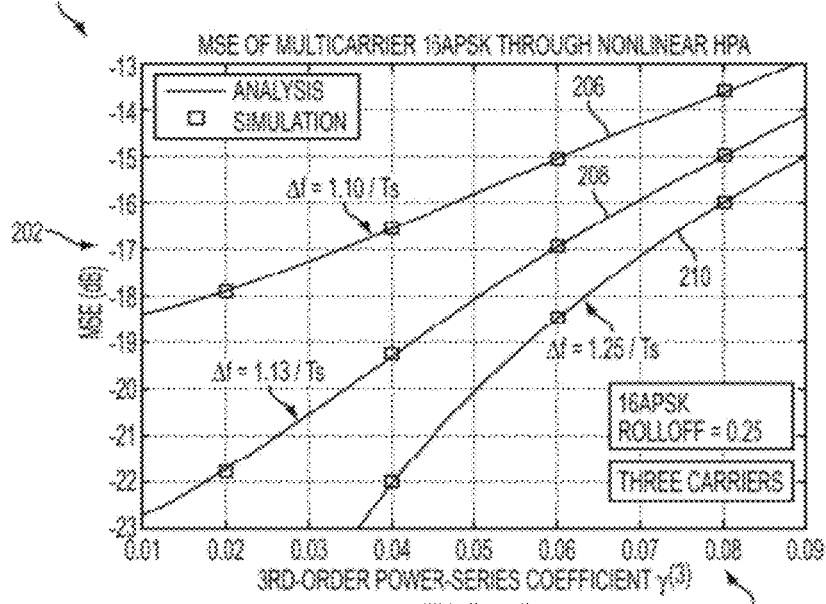
FIG. 2 illustrates a graph for mean squared error (MSE) of IMD with third-order power series coefficient $\gamma^{(3)}$, when three carriers of 16APSK pass through a nonlinear HPA.

FIG. 2 illustrates a graph 200 for MSE of IMD with third-order power series coefficient $\gamma^{(3)}$, when three carriers of 16APSK pass through nonlinear HPA 106.

As illustrated in the figure, a y-axis 202 represents MSE in dB and an x-axis 204 represents third-order power series coefficient $\gamma^{(3)}$. Graph 200 includes a function 206, a function 208 and a function 210 for different values of frequency separation ($\Delta f$) among the carriers with respect to symbol rate $1/T_s$.

Function 206 represents a curve with $\Delta f=1.1/T_s$. Function 208 represents a curve with $\Delta f=1.13/T_s$. Function 210 represents a curve with $\Delta f=1.25/T_s$. For higher frequency separation ($\Delta f=1.25/T_s$), as $\gamma^{(3)}$ is reduced, MSE goes down as well, towards negative infinity as shown in graph 200. However, for smaller frequency separation ($\Delta f=1.1/T_s$), when $\gamma^{(3)}$ is reduced, MSE approaches a constant value because carrier signals are close together resulting in linear distortion.

Referring back to equation (4), for l=0, $\gamma^{(1)}$ contributes to the linear distortion of HPA 106. For l=1, $\gamma^{(1)}$ contributes to the third-order distortion of nonlinear HPA 106. As is obvious from graph 200, as frequency separation between the carriers is reduced ($\Delta f$ is smaller), MSE goes up, resulting in more distortion. Also, as $\gamma^{(3)}$ is increased, nonlinearity of the amplifier increases resulting in higher MSE or distortion.

Figure 3:
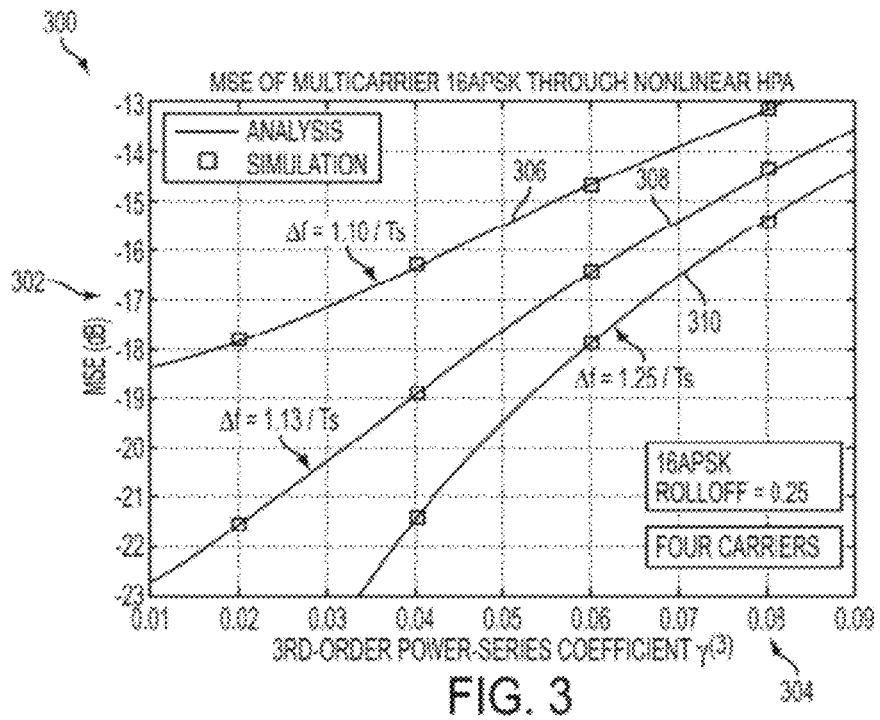
FIG. 3 illustrates a graph for MSE with third-order power series coefficient $\gamma^{(3)}$, when four carriers of 16APSK pass through a nonlinear HPA.

FIG. 3 illustrates a graph 300 for MSE with third-order power series coefficient $\gamma^{(3)}$, when four carriers of 16APSK pass through nonlinear HPA 106.

As illustrated in the figure, a y-axis 302 represents MSE in dB and an x-axis 304 represents third-order power series coefficient $\gamma^{(3)}$. Graph 300 includes a function 306, a function 308 and a function 310 for different values of frequency separation ($\Delta f$) among the carriers with respect to symbol rate $1/T_s$.

Function 306 represents a curve with $\Delta f=1.1/T_s$ function 308 represents a curve with $\Delta f=1.13/T_s$ and function 310 represents a curve with $\Delta f=1.25/T_s$. As discussed with reference to FIG. 2 for three carriers, as frequency separation between the carriers is reduced for four carriers, MSE goes up, resulting in more distortion.

It can be seen that analysis and simulations are in complete agreement. This confirms the accuracy of the Volterra based characterization of IMD among carriers, the accuracy of the method of computing expectation of higher-order products of complex-valued multicarrier symbols in quantifying IMD, and the sufficiency of including carrier combinations associated with IMD centered at zero and $\pm \Delta f$. Further, the method of computing expectations of higher-order products of random complex-valued data symbols from multiple carriers in equation (21) is very useful in calculating the minimum mean-squared error (MMSE) equalizer coefficients for turbo Volterra processing, described further.

Based on the above analysis, a turbo Volterra equalizer employed at the receiver, in accordance with an aspect of the present invention is presented. Its novel component is a turbo nonlinear equalizer (in one example, a multicarrier Volterra equalizer), which is capable of reconstructing IMD among carriers by applying the above analysis, as described further using FIG. 4.

Figure 4:
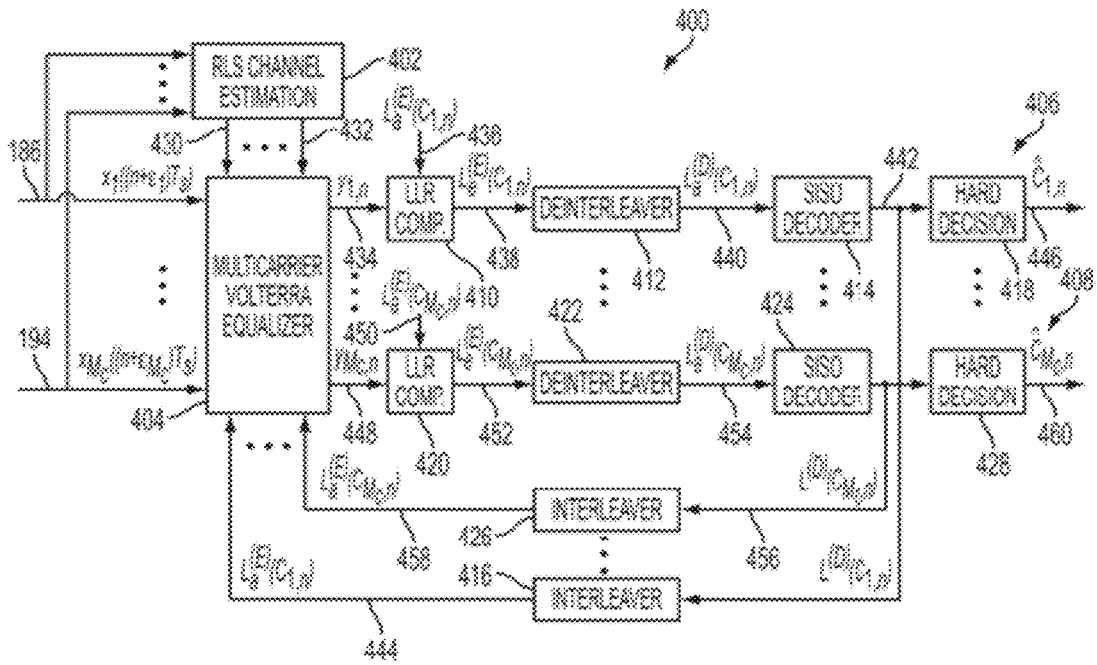
FIG. 4 illustrates an example turbo Volterra equalizer for a receiver of a multicarrier communication system in accordance with an aspect of the present invention.

FIG. 4 illustrates a turbo nonlinear equalizer 400 for a receiver of a multicarrier communication system in accordance with an aspect of the present invention. In an example embodiment, turbo nonlinear equalizer 400 comprises a turbo Volterra equalizer, for purposes of explanation. However, any turbo nonlinear equalizer may be used, non-limiting examples of which include a turbo Hammerstein equalizer and a turbo Wiener equalizer.

As illustrated in the figure, turbo nonlinear equalizer 400 includes a recursive least squares (RLS) channel estimator 402, a multicarrier turbo nonlinear equalizer 404, a post-equalizer receive path 406 for carrier 1 and a post-equalizer receive path 408 for carrier $M_c$. In an example embodiment, multicarrier turbo nonlinear equalizer 404 comprises a multicarrier turbo Volterra equalizer, for purposes of explanation. However, any multicarrier turbo nonlinear equalizer may be used, non-limiting examples of which include a multicarrier turbo Hammerstein equalizer and a multicarrier turbo Wiener equalizer. Post-equalizer receive path 406 further includes a log likelihood ratio (LLR) computer 410, a deinterleaver 412, a soft-in soft-out (SISO) decoder 414, an interleave 416 and a hard decision portion 418. Similarly, post-equalizer receive path 408 further includes a LLR computer 420, a deinterleaver 422, a SISO decoder 424, an interleaver 426 and a hard decision portion 428. FIG. 4 illustrates only post-equalizer receive paths 406 and 408, however, there may be similar receive paths for other carriers as shown by the dots.

In FIG. 4, each of RLS channel estimator 402 and multicarrier turbo nonlinear equalizer 404 are illustrated as distinct devices, however, they may be combined as a unitary device. Similarly, each of LLR computer 410, deinterleaver 412, SISO decoder 414, interleaver 416 and hard decision portion 418 are illustrated as distinct devices. However, at least two of LLR computer 410, deinterleaver 412, SISO decoder 414, interleaver 416 and hard decision portion 418 may be combined as a unitary device. Similarly, each of LLR computer 420, deinterleaver 422, SISO decoder 424, interleaver 426 and hard decision portion 428 are illustrated as distinct devices. However, at least two of LLR computer 420, deinterleaver 422, SISO decoder 424, interleaver 426 and hard decision portion 428 may be combined as a unitary device.

RLS channel estimator 402 is operable to provide an estimate of the channel from the noisy signals. It receives sample signals 186 through 194 from all receiver front ends and provides generalized Volterra kernel estimate signals 430 through 432 to multicarrier turbo nonlinear equalizer 404, obtained by RLS channel estimation at the end of pilot-based training. The word "through" in this paragraph and the next paragraph is used to indicate the signals mentioned and also similar signals from other carriers. For example, in a learning operation, RLS channel estimator 402 may receive a plurality of training symbols as signals 186 through 194, on channels 1 through $M_c$, respectively. RLS channel estimator 402 may additionally be provided with the originally transmitted symbols, for example (as discussed above with reference to FIG. 1) the symbols provided by gray-coded APSK modulator 118 through gray-coded APSK modulator 130. With the originally transmitted symbols and the received symbols, RLS channel estimator 402 may estimate each channel based on the differences between the originally transmitted symbols and the received symbols.

Multicarrier turbo nonlinear equalizer 404 is operable to clean up received symbols on the plurality of channels by addressing issues related to IMD, including linear and non-linear interference. In particular, by using an estimate of the channels as provided by RLS channel estimator 402, multicarrier turbo nonlinear equalizer 404 may iteratively change the received symbols (one for each received channel). More specifically, after each iterative change, the changed symbols are eventually fed back to multicarrier turbo nonlinear equalizer 404, so as to be further changed based on the estimate of the channels as provided by RLS channel estimator 402. This will be described in greater detail below.

Multicarrier turbo nonlinear equalizer 404 is arranged to receive sample signals 186 through 194 from multiple receiver front ends, channel estimation signals 430 through 432 from RLS channel estimator 402 and signals 444 through 458 from a previous decoding iteration. Multicarrier turbo nonlinear equalizer 404 is capable of reconstructing IMD among carriers by applying the analysis described earlier. Multicarrier turbo nonlinear equalizer 404 operates on the bank of receive filters $x_m((n+\epsilon_m)T_s)$ provided by the output of receiver front end of FIG. 1, and uses a priori LLRs, $L_a^{(E)}(c_{m,n})$, of every code bit for multiple carriers as represented by signals 444 and 458.

An LLR computer is needed to convert the output $y_{m,n}$ of multicarrier turbo nonlinear equalizer 404, assumed to follow Bivariate Gaussian distribution, into extrinsic LLRs regarding the code bits, $L_e^{(E)}(c_{m,n})$, by using a priori LLRs from the previous decoding iteration. With reference to FIG. 4, LLR computer 410 is operable to convert a signal 434 out multicarrier turbo nonlinear equalizer 404, into extrinsic LLRs regarding the code bits signal 438, by using a priori LLR signal 436, represented by $L_a^{(E)}(c_{l,n})$, from the previous decoding iteration.

This updated set of soft information about the codebits is then deinterleaved and provided as a priori LLRs, $L_a^{(D)}(c_{m,n})$, for the next decoding iteration. With reference to FIG. 4, deinterleaver 412 is operable to receive a code bits signal 438 and provides a signal 440, represented by $L_a^{(D)}(c_{l,n})$, after deinterleaving.

SISO decoder 414 provides soft decision data as LLR signal 442. Hard decision decoding takes a stream of bits say from the 'threshold detector' stage of a receiver, where each bit is considered definitely one or zero. For example, for binary signaling, received pulses are sampled and the resulting voltages are compared with a single threshold. If a voltage is greater than the threshold, it is considered to be definitely a 'one' regardless of how close it is to the threshold. If a voltage is less than or equal to the threshold, it is considered to be definitely zero.

Soft decision decoding requires a stream of 'soft bits' where not only the 1 or 0 decision is received, but also an indication of certainty that the decision is correct. For example, a SISO decoder 414 may generate, instead of 0 or 1, say:
 000 (definitely 0), 001 (probably 0), 010 (maybe 0), 011 (guess 0), 100 (guess 1), 101 (maybe 1), 110 (probably 1), 111 (definitely 1).

SISO decoder 414 is operable to receive deinterleaved signal 440 and provides a posteriori LLR signal 442, represented by $L^{(D)}(c_{l,n})$ to interleaver 416, which provides an interleaved signal 444, represented by $L_a^{(E)}(c_{l,n})$, to multicarrier turbo nonlinear equalizer 404 for the next decoding iteration. Hard decision portions 418 and 428 provide final estimates of decoded bits.

Multicarrier turbo nonlinear equalizer 404 is also adaptive as it receives generalized Volterra kernel estimates, obtained by RLS channel estimation at the end of pilot-based training, and utilizes a modular matrix vector formulation, described further in detail. The modularity of multicarrier turbo nonlinear equalizer 404 stems from the situation that only the modules pertaining to carrier combinations with significant contribution need to be retained. Compensation of the nonlinear interference is done through linear MMSE equalization, which will be described in greater detail later.

A formulation is introduced, which models the nonlinear components derived above. This formulation is linear in terms of its input so it can be directly utilized for deriving equalization algorithms. Initially, an instantaneous version is introduced that only incorporates the receive filter bank at the current time instant, but will be expanded at the end of the section to include successive time samples. By denoting $$\underline{x}(n) \triangleq [x_1((n+\epsilon_1)T_s) x_2((n+\epsilon_2)T_s) \ldots x_{M_c}((n+\epsilon_{M_c})T_s)]^T, \quad (24)$$

The output of the bank of receive filters at the nth time instant is described in matrix form as $$\underline{x}(n) = H^{(3)}(n) \cdot \underline{a}_{NL}^{(3)}(n) + \underline{n}(n), \quad (25)$$

where $\underline{n}(n)$ is a zero-mean complex-valued Gaussian noise vector with covariance matrix $R_N(n)$, assembled using the component wise relation described by equation (15). In equation (25), the matrix $H^{(3)}(n)$ models the intermodulation products among carriers, expressed as $$H^{(3)}(n) \triangleq [\underline{h}_1(n) \underline{h}_2(n) \ldots \underline{h}_{M_c}(n)]^T, \quad (26)$$

whose rows are vectors $$\underline{h}_{m_d}(n) \triangleq \begin{bmatrix} \underline{h}_{m_d}^{(1)}(n; L') \\ \underline{h}_{m_d}^{(3)}(n; L) \end{bmatrix}; m_d = 1, 2, \ldots, M_c, \quad (27)$$

$$\underline{h}_{m_d}^{(1)}(n; L') \triangleq \begin{bmatrix} \underline{\eta}_{1 m_d}^{(1)}(n; L') \\ \vdots \\ \underline{\eta}_{M_c m_d}^{(1)}(n; L') \end{bmatrix}; \quad (28)$$

$$\underline{h}_{m_d}^{(3)}(n; L) \triangleq \begin{bmatrix} \underline{\eta}_{m_1 m_2 m_3 m_d}^{(3)}(n; L) \\ \vdots \\ \underline{\eta}_{m_1' m_2' m_3' m_d}^{(3)}(n; L) \end{bmatrix}.$$

The vectors $\underline{h}_{m_d}^{(1)}(n; L')$ and $\underline{h}_{m_d}^{(3)}(n; L)$ of equation (28) are in turn composed of vectors $\underline{\eta}_{m m_d}^{(1)}(n; L')$ and $\underline{\eta}_{m_1 m_2 m_3 m_d}^{(3)}(n; L)$ that incorporate the memory of the first-order interference from the mth carrier, of size L' symbols, and the memory of the third-order interference, of size L symbols associated with carrier combination $[m_1 m_2 m_3]$, respectively, expressed as:

$$\underline{\eta}_{m m_d}^{(1)}(n; L') \triangleq \gamma^{(1)} \cdot e^{j(2\pi(f_m - f_{m_d})(n + \epsilon_{m_d})T_s + (\theta_m - \theta_{m_d}))} \cdot \begin{bmatrix} h_{m m_d}^{(1)}\left(\left(\frac{L'-1}{2} - \delta\epsilon_m\right)T_s; f_m - f_{m_d}\right) \\ h_{m m_d}^{(1)}\left(\left(\frac{L'-1}{2} - 1 - \delta\epsilon_m\right)T_s; f_m - f_{m_d}\right) \\ \vdots \\ h_{m m_d}^{(1)}\left(\left(\frac{L'-1}{2} - \delta\epsilon_m\right)T_s; f_m - f_{m_d}\right) \end{bmatrix}, \quad (29)$$

and $$\eta^{(3)}_{m_1 m_2 m_3 m_d}(n; L) \triangleq \frac{\gamma^{(3)}}{M_c} \cdot 2^{1-\delta_{m_1 m_2}} \cdot e^{j(2\pi(f_{m_1}+f_{m_2}-f_{m_3}-f_{m_d})(n+c_{m_d})T_s + (\theta_{m_1}+\theta_{m_2}-\theta_{m_3}-\theta_{m_d}))}. \tag{30}$$

$$\begin{bmatrix} h^{(3)}_{m_1 m_2 m_3 m_d}\left(\left(\frac{L-1}{2}-\delta\epsilon_{m_1}\right)T_s, \left(\frac{L-1}{2}-\delta\epsilon_{m_2}\right)T_s, \left(\frac{L-1}{2}-\delta\epsilon_{m_3}\right)T_s; f_{m_1}+f_{m_2}-f_{m_3}-f_{m_d}\right) \\ h^{(3)}_{m_1 m_2 m_3 m_d}\left(\left(\frac{L-1}{2}-\delta\epsilon_{m_1}\right)T_s, \left(\frac{L-1}{2}-\delta\epsilon_{m_2}\right)T_s, \left(\frac{L-1}{2}-1-\delta\epsilon_{m_3}\right)T_s; f_{m_1}+f_{m_2}-f_{m_3}-f_{m_d}\right) \\ \vdots \\ h^{(3)}_{m_1 m_2 m_3 m_d}\left(\left(-\frac{L-1}{2}-\delta\epsilon_{m_1}\right)T_s, \left(-\frac{L-1}{2}-\delta\epsilon_{m_2}\right)T_s, \left(-\frac{L-1}{2}-\delta\epsilon_{m_3}\right)T_s; (f_{m_1}+f_{m_2}-f_{m_3}-f_{m_d})\right) \end{bmatrix},$$

where $h_{mm_d}^{(1)}(t; f)$ and $h_{m_1 m_2 m_3 m_d}^{(3)}(t_1, t_2, t_3; f)$ are the generalized Volterra kernels of the first and third orders.

Furthermore, the corresponding vector of symbols $\underline{a}_{NL}^{(3)}(n)$ in equation (25) is given by:

$$\underline{a}_{NL}^{(3)}(n) \triangleq \begin{bmatrix} \underline{a}^{(1)}(n; L') \\ \underline{a}^{(3)}(n; L) \end{bmatrix}, \tag{31}$$

$$\underline{a}^{(1)}(n; L') \triangleq \begin{bmatrix} \underline{\alpha}_1^{(1)}(n; L') \\ \vdots \\ \underline{\alpha}_{M_c}^{(1)}(n; L') \end{bmatrix}; \underline{a}^{(3)}(n; L) \triangleq \begin{bmatrix} \underline{\alpha}_{m_1 m_2 m_3}^{(1)}(n; L) \\ \vdots \\ \underline{\alpha}_{m'_1 m'_2 m'_3}^{(1)}(n; L) \end{bmatrix}. \tag{32}$$

In equation (32), $\underline{a}_m^{(1)}(n; L')$ is the vector of interfering symbols of the first-order from the mth carrier with double-sided memory of L' symbols $$\underline{\alpha}_m^{(1)}(n; L') \triangleq \begin{bmatrix} a_{m, n-\frac{L'-1}{2}} \\ a_{m, n-\frac{L'-1}{2}+1} \\ \vdots \\ a_{m, n+\frac{L'-1}{2}} \end{bmatrix}, \tag{33}$$

and $a_{m_1 m_2 m_3}^{(3)}(n; L)$ is the vector of interfering symbols of the third-order associated with the $[m_1 m_2 m_3]$ carrier combination and double sided memory of L symbols:

$$\underline{\alpha}_{m_1 m_2 m_3}^{(3)}(n; L) \triangleq \begin{bmatrix} a_{m_1, n-\frac{L-1}{2}} \cdot a_{m_2, n-\frac{L-1}{2}} \cdot a^*_{m_3, n-\frac{L-1}{2}} \\ a_{m_1, n-\frac{L-1}{2}} \cdot a_{m_2, n-\frac{L-1}{2}} \cdot a^*_{m_3, n-\frac{L-1}{2}+1} \\ \vdots \\ a_{m_1, n+\frac{L-1}{2}} \cdot a_{m_2, n+\frac{L-1}{2}} \cdot a^*_{m_3, n+\frac{L-1}{2}} \end{bmatrix}. \tag{34}$$

Taking into consideration specific examples of Volterra vectors $\underline{h}_{m_d}(n)$ that applies the multicarrier analysis of previous section, third-order Volterra vectors are described further.

Using Table I, the third-order Volterra vector that incorporates ISI and IMD that is frequency centered at zero, for the three-carrier case when center carrier is desired, is described as:

$$\underline{h}_2(n) = [\underline{\eta}_{12}^{(1)}(n; L')^T \underline{\eta}_{22}^{(1)}(n; L')^T \underline{\eta}_{32}^{(1)}(n; L')^T \\ \underline{\eta}_{1212}^{(3)}(n; L)^T \underline{\eta}_{1322}^{(3)}(n; L)^T \underline{\eta}_{2222}^{(3)}(n; L)^T \\ \underline{\eta}_{2332}^{(3)}(n; L)^T]^T, \tag{35}$$

whose size is $(3 \cdot L' + 4 \cdot L^3) \times 1$.

Using Table I, the third-order Volterra vector that incorporates ISI and IMD that is frequency centered at zero, for the four-carrier case when center carrier is desired, is described as:

$$\underline{h}_2(n) = [\underline{\eta}_{12}^{(1)}(n; L')^T \underline{\eta}_{22}^{(1)}(n; L')^T \underline{\eta}_{32}^{(1)}(n; L')^T \\ \underline{\eta}_{1212}^{(3)}(n; L)^T \underline{\eta}_{1322}^{(3)}(n; L)^T \underline{\eta}_{1432}^{(3)}(n; L)^T \\ \underline{\eta}_{2222}^{(3)}(n; L)^T \underline{\eta}_{2332}^{(3)}(n; L)^T \underline{\eta}_{2442}^{(3)}(n; L)^T \\ \underline{\eta}_{3342}^{(3)}(n; L)^T]^T, \tag{36}$$

whose size is $(3 \cdot L' + 7 \cdot L^3) \times 1$.

The instantaneous multicarrier formulation can be further generalized to include successive time samples of the receive filter bank spanning L' symbols around the nth time instant by stacking vectors $\underline{x}(n)$ of equation (24) for $$n - \frac{L'-1}{2}, \ldots, n + \frac{L'-1}{2}$$

as $$\underline{\tilde{x}}(n) \triangleq \begin{bmatrix} \underline{x}\left(n - \frac{L'-1}{2}\right) \\ \underline{x}\left(n - \frac{L'-1}{2} + 1\right) \\ \vdots \\ \underline{x}\left(n + \frac{L'-1}{2}\right) \end{bmatrix}, \tag{37}$$

where $(\tilde{\cdot})$ indicates stacked construction. Then $\underline{x}(n)$ in equation (37) is expressed as:

$$\underline{\tilde{x}}(n) = \tilde{H}^{(3)}(n) \cdot \underline{\tilde{a}}_{NL}^{(3)}(n) + \underline{\tilde{n}}(n), \tag{38}$$

with its quantities regarding generalized Volterra kernels summarized as $$\tilde{H}^{(3)}(n) \triangleq \begin{bmatrix} \tilde{H}_{m_d}^{(1)}(n) \\ \tilde{H}_{m_d}^{(3)}(n) \end{bmatrix}^T ; \tilde{H}_{m_d}^{(1)}(n) \triangleq \begin{bmatrix} \tilde{h}_{1m_d}^{(1)}(n) \\ \tilde{h}_{2m_d}^{(1)}(n) \\ \vdots \\ \tilde{h}_{M_c m_d}^{(1)}(n) \end{bmatrix}, \quad (39)$$

$$\tilde{h}_{mn_d}^{(1)}(n) \triangleq \begin{bmatrix} \eta_{mn_d}^{(1)}\left(n+\frac{L'-1}{2};L'\right) & 0 & 0 & \cdots & 0 \\ 0 & \eta_{mn_d}^{(1)}\left(n+\frac{L'-1}{2}-1;L'\right) & 0 & \cdots & 0 \\ \vdots & & \cdots & \cdots & \vdots \\ 0 & & \cdots & 0 & 0 & \eta_{mn_d}^{(1)}\left(n-\frac{L'-1}{2};L'\right) \end{bmatrix}, \quad (40)$$

$$\tilde{H}_{m_d}^{(3)}(n) \triangleq \begin{bmatrix} \underline{h}_{m_d}^{(3)}\left(n+\frac{L'-1}{2};L\right) & \underline{0} & \underline{0} & \cdots & \underline{0} \\ \underline{0} & \underline{h}_{m_d}^{(3)}\left(n+\frac{L'-1}{2}-1;L\right) & \underline{0} & \cdots & \underline{0} \\ \vdots & & \cdots & \cdots & \vdots \\ \underline{0} & & \cdots & \underline{0} & \underline{0} & \underline{h}_{m_d}^{(3)}\left(n-\frac{L'-1}{2};L\right) \end{bmatrix}, \quad (41)$$

and its vector of products and cross-products of transmitted symbols given by $$\tilde{a}_{NL}^{(3)}(n) \triangleq \begin{bmatrix} \underline{a}^{(1)}(n; 2L'-1) \\ \underline{a}^{(3)}\left(n-\frac{L'-1}{2};L\right) \\ \underline{a}^{(3)}\left(n-\frac{L'-1}{2}+1;L\right) \\ \vdots \\ \underline{a}^{(3)}\left(n+\frac{L'-1}{2};L\right) \end{bmatrix}. \quad (42)$$

The constituent vectors contained in equations (40)-(42) are already defined in equations (28)-(30) and (32)-(34), and the vector 0 in equation (41) is all zeros with size $L^3 \times 1$.

In practice, Volterra vectors $h_{m_d}(n)$ of equation (27) can be calculated adaptively by using stochastic gradient-based algorithms such as a superior known RLS method. This way, the formulation can be evaluated without prior knowledge of the nonlinearity characteristics and can be rapidly responsive to variations in the environment. Application of RLS to nonlinear channel identification is incorporated into the simulations, which are described later on. Furthermore, the formulation derived in accordance with an aspect of the present invention is modular, where only the modules pertaining to carrier combinations with significant contribution need to be retained. Within each module of carrier combination [$m_1 m_2 m_3$], the time combination with small contribution can be discarded for more reduction in the size of the matrices.

Referring back to multicarrier turbo nonlinear equalizer 404, equalization is performed by applying linear MMSE filtering with both feed-forward and feedback coefficients on the matched filter output vector $\tilde{x}(n)$ of equation (37) as $$y_{m,n} = \underline{c}_f^T \cdot \tilde{x}(n) + c_b, \quad (43)$$

where $y_{m,n}$ represents equalized output signal 434. The coefficients $\underline{c}_f$ and $c_b$, representing the sum of feedback terms, are derived by minimizing the MSE between $y_{m,n}$ and the desired symbol $a_{m,n}$. It is straightforward to obtain the equalizer output as $$y_{m,n} = \underline{c}_f^T \cdot (\tilde{x}(n) - \tilde{H}_I^{(3)}(n) \cdot \mathbb{E}\{\underline{\tilde{a}}_I^{(3)}(n) | L_a^{(E)}\}), \quad (44)$$

where subscript I indicates that the component associated with desired symbol $a_{m,n}$ is set to zero and $$\underline{c}_f^T = \underline{h}_m^{(1)}(n; L')^H \cdot (\underline{h}_m^{(1)}(n; L') \cdot \underline{h}_m^{(1)}(n; L')^H + \tilde{R}_N(n) + \tilde{H}_I^{(3)}(n).$$

$$(\mathbb{E}\{\tilde{a}_I^{(3)}(n) \cdot \tilde{a}_I^{(3)}(n)^H | L_a^{(E)}\} - \mathbb{E}\{\tilde{a}_I^{(3)}(n) | L_a^{(E)}\} \mathbb{E}\{\underline{\tilde{a}}_I^{(3)}(n) | L_a^{(E)}\}^H) \tilde{H}_I^{(3)}(n)^H)^{-1}. \quad (45)$$

By making a simplifying choice for $\underline{c}_f$ as all-zeros vector except for unity in the component $(m-1) \cdot L' + (L'+1)/2$, a lower-complexity version of the equalizer from equation (44) can be expressed as:

$$y_{m,n} \approx x_{m,n} - H_I^{(3)}(n)|_{mth\,row} \cdot \mathbb{E}\{\underline{a}_I^{(3)}(n) | L_a^{(E)}\}. \quad (46)$$

This represents a large reduction in complexity as it relies only on the instantaneous formulation of previous section, does not require computing correlation of symbol vectors, and avoids the matrix inversion. Centroids are used to account for the constellation warping caused by the presence of nonlinearity. This can be used when estimating the nonlinear interference for the sake of improving performance, transforming equation (46) into $$y_{m,n} = x_{m,n} - [H^{(3)}(n)|_{mth\,row} \cdot \mathbb{E}\{\underline{a}^{(3)}(n) | L_a^{(E)}\} - \mathbb{E}\{P_m^{centroid}(a_{m,n}) | L_a^{(E)}\}], \quad (47)$$

where $P_m^{centroid}(a_l)$ is the centroid value associated with $a_l$, computed during pilot-based training.

In equations (44)-(47), the expectations $\mathbb{E}\{\underline{a}^{(3)}(n) | L_a^{(E)}\}$ and $\mathbb{E}\{\underline{a}^{(3)}(n) \cdot \underline{a}^{(3)}(n)^H | L_a^{(E)}\}$ can be computed using component-wise relations, where first and third order symbol products are needed for the former and second, fourth and sixth order symbol products are used for the latter. These higher order products of complex-valued symbols can be calculated using the techniques presented in earlier section when evaluating the MSE performance. Namely, $$\mathbb{E}\{a_{m_1,k_1} a_{m_2,k_2} \cdots a_{m_p,k_p} \cdot a_{m_{p+1},k_{p+1}}^* a_{m_{p+2},k_{p+2}}^* \cdots a_{m_q,k_q}^* | L_a^{(E)}\} = \quad (48)$$

$$\prod_{m=1}^{M_c} \prod_{i=n-(L-1)/2}^{n+(L-1)/2} \mathbb{E}\left\{a_{m,i}^{v_{m,i}} \left(a_{m,i}^{v_{m,i}^*}\right)^* \mid L_a^{(E)}\right\},$$

where the parameters $v_{m,i}$ and $v^*_{m,i}$ are defined in equation (21) and the product of expectations is possible due to the independence across carriers and across symbols, as provided by the interleaving operations. The individual terms in the product of equation (48) are then computed as $$\mathbb{E}\left\{a_{m,i}^{v_{m,i}} \left(a_{m,i}^{v_{m,i}^*}\right)^* \mid L_a^{(E)}\right\} = \sum_{l=1}^{M} a_l^{v_{m,i}} \left(a_l^{v_{m,i}^*}\right)^* \cdot P\{a_{m,i} = a_l \mid L_a^{(E)}\}, \quad (49)$$

where conditional symbol probability $P\{a_{m,i}=a_l|L_a^{(E)}\}$ is formed on the basis of the a priori LLR of the corresponding code bits provided by the bank of SISO decoders at the previous iteration.

More specifically, letting the symbol $a_{m,n}$ correspond to the set of code bits $\{c_{m},(n-1)\cdot\log_2 M+j; j=1, 2, \ldots, \log_2 M\}$, the conditional symbol probability can be expressed as:

$$P\{a_{m,n} = a_l \mid L_a^{(E)}\} = \prod_{j=1}^{\log_2 M} P\{c_{m,(n-1)\cdot\log_2 M + j} = c_{l,j} \mid L_a^{(E)}\}. \quad (50)$$

where the code bits $c_{l,j}$ takes value 1 or 0 depending on the mapping associated with symbol $a_l$, and the conditional bit probability is readily obtained as:

$$P\{c_{m,n} = 1 \mid L_a^{(E)}\} = 1 - P\{c_{m,n} = 0 \mid L_a^{(E)}\} = \frac{e^{L_a^{(E)}(c_{m,n})}}{1 + e^{L_a^{(E)}(c_{m,n})}}. \quad (51)$$

The final step in the equalization is to convert the compensated output $y_{m,n}$ into extrinsic LLRs of the code bits to be used for the next decoding iteration. This is done by using Bayes rule along with conditional symbol probability $P\{a_{m,n}=a_l|L_a^{(E)}\}$ of equation (50) to provide signal 438 (for m=1) as:

$$L_e^{(E)}(c_{m,n}) = \ln\left[\frac{\sum_{a_{m,n}: c_{m,n}=1} p(y_{m,n} \mid a_{m,n} = a_l, L_a^{(E)}) \cdot P\{a_{m,n} = a_l \mid L_a^{(E)}\}}{\sum_{a_{m,n}: c_{m,n}=0} p(y_{m,n} \mid a_{m,n} = a_l, L_a^{(E)}) \cdot P\{a_{m,n} = a_l \mid L_a^{(E)}\}}\right] - \quad (52)$$

$$L_a^{(E)}(c_{m,n}) ..$$

In order to better match the residual nonlinear distortion in $y_{m,n}$, the conditional probability density function (pdf) $p(y_{m,n}|a_{m,n}=a_l,L_a^{(E)})$ in equation (52) is computed here according to the more general Bivariate Gaussian distribution. This maintains the Gaussian assumption for simplicity, but allows the distortion clusters, as is often the case, to have elliptical shape with some rotation. Namely, $$p(y_{m,n} \mid a_{m,n} = a_l, L_a^{(E)}) = \frac{1}{2\pi \sigma_{I,l}\sigma_{Q,l}\sqrt{1-\rho_l^2}} \quad (53)$$

$$\exp\left(-\frac{1}{2(1-\rho_l^2)} \cdot \left[\frac{(y_{m,n}^{(I)} - \mu_{I,l})^2}{\sigma_{I,l}^2} + \frac{(y_{m,n}^{(Q)} - \mu_{Q,l})^2}{\sigma_{Q,l}^2} - 2\rho_l \frac{(y_{m,n}^{(I)} - \mu_I)}{\sigma_{I,l}} \frac{(y_{m,n}^{(Q)} - \mu_{Q,l})}{\sigma_{Q,l}}\right]\right),$$

where $y_{m,n}=y_{m,n}^{(I)}+jy_{m,n}^{(Q)}$, and $\mu_{I,l}$, $\sigma_{I,l}$, $\mu_{Q,l}$, $\sigma_{Q,l}$, are the mean and standard deviation, respectively, of the real and imaginary parts of $y_{m,n}$, and $p_l$ is the normalized correlation. These statistics are computed using maximum-likelihood estimation per constellation point $a_l$ during the pilot-based training. As distortion is reduced with more iterations, it is expected that $p_l \approx 0$, $\sigma_{I,l} \approx \sigma_{Q,l}$ and the Bivariate reduces to the standard circular pdf.

As discussed above with reference to FIG. 4, turbo nonlinear equalizer 400 receives signal samples from receiver front ends of multicarrier communication system 100 and provides an improved version of the received signal by minimizing the distortion. Turbo nonlinear equalizer 400 does not rely on the specific knowledge of the channel but tries to adapt it with estimation using the RLS criterion. Note that an example embodiment in accordance with aspects of the present invention uses the RLS criterion, however, any adaptation estimation may be used.

Extensive Monte-Carlo simulations are conducted to evaluate bit error rate (BER) performance and demonstrate the effectiveness of the proposed methods in compensating for IMD. The simulation setup implements the system model of FIG. 1, followed by multicarrier turbo Volterra receiver of FIG. 4. For specificity, a composite signal is selected to include multiple equally-spaced carriers with frequency spacing $\Delta f=1.25\,T_s^{-1}$, each modulated by Gray-coded APSK. Two signal constellations are evaluated: 16-ary with two rings containing 4 points and 12 points; and 32-ary with three rings containing 4, 12 and 16 points. The number of carriers examined is three and four to simplify simulations, but the analysis and tools for compensation are developed for a general $M_c$. The transmit and receive filter $p_{m,T}(t)$ and $p_{m,R}(t)$ are a pair of matched RRC filters with roll-off of 0.25. Regarding FEC coding, all the carriers employ DVB-S2 LDPC codes with length 16200 bits and a rate of ⅔ or ¾. LDPC codes are powerful as they approach Shannon capacity to within 0.6 dB-0.8 dB with 50 internal decoding iterations. Also, different random interleavers are used by the different carriers.

The nonlinear transponder HPA used for performance evaluation follows the Saleh model with parameters as used in previous studies. Specifically, the nonlinearity is described, in terms of the input amplitude r, by the following AM/AM and AM/PM conversions $$A(r) = \frac{2 \cdot r}{1+r^2}; \Phi(r) = \frac{\pi}{6} \cdot \frac{r^2}{1+r^2}, \quad (54)$$

respectively. The output backoff (OBO) is defined as the loss in power, relative to saturation, of the modulated signal, and is measured at the receive RRC filter output after sampling, i.e., the noiseless $x_m((n+\epsilon_m)T_s)$. Synchronization at the receiver is assumed ideal.

The RLS adaptation algorithm, utilized to compute generalized Volterra kernels, used forgetting factor $\lambda$ set to unity and training sequence spanning only one codeword, to achieve quick response to varying conditions. Performance is expected to improve with longer training sequence. The double sided memory of the receiver used in the simulations is three symbols for linear and nonlinear interference components, or L'=L=3. To simplify the simulations, only the lower complexity receiver in equation (46) is evaluated. More performance gain can be attained by also incorporating feedforward coefficients when considering aggressive channel spacing. Only carrier combinations that are frequency centered at zero, listed in Table I, are incorporated when reconstructing IMD for BER evaluations.

To bound performance, two additional cases are simulated: a case wherein there is no compensation (only fixed amplitude and phase correction); and ideal case of the multicarrier turbo Volterra equalizer when correct decisions are fed back. The case of linear channel with only AWGN impairment is provided for reference. The pair (u,v) in the performance curves is used to enumerate the iterations where u is the number of compensations and v is the number of single carrier iterations within the LDPC decoder. The first iteration of nonlinear compensation uses hard decisions from receive filters $x_m((n+\epsilon_m)T_s)$ directly. Second and higher iterations of nonlinear compensation use information about the codebits, as supplied by single carrier decoders.

The BER performance, based on the above simulation results for a family of multicarrier Volterra equalizers will be described below using FIGS. 5-8.

FIG. 5 illustrates a graph 500 for BER performance of a family of multicarrier Volterra equalizers with signal to noise ratio/bit ($E_b/N_o$) for 16APSK modulation, in accordance with an aspect of the present invention.

Graph 500 includes the BER performance when the number of carriers is three, LDPC code rate is ⅔ and the HPA is operated at aggregate OBO level of 2.1 dB. As illustrated in the figure, a y-axis 502 represents BER and an x-axis 504 represents signal to noise ratio/bit ($E_b/N_o$) in dB. Graph 500 includes a function 506, a function 508, a function 510, a function 512, a function 514, a function 516, a function 518 and a function 520.

Function 520 represents BER performance for three carriers with minimal compensation for a conventional HPA. The BER performance without compensation as represented by function 520, even after 50 internal decoding iterations, suffers from 2.4 dB in degradation relative to the ideal case of correct decisions at BER of $2\times10^{-5}$, as represented by function 508. With one iteration of nonlinear compensation and 40 decoding iterations, as represented by function 518, the performance is reasonable, providing an improvement of 1.4 dB relative to no compensation of function 520. However, when using soft decisions from the bank of single carrier decoders, and with only three iterations of joint compensation and decoding, the performance approaches the ideal case to within 0.2 dB, as shown by function 510.

Functions 514, 516 and 518 represent BER performance when applying turbo Volterra method but with feeding back hard decisions from the decoders, a special case that would be needed if soft output from decoders is unavailable due to complexity. In an example embodiment, using hard decisions may be implemented by replacing a soft-in soft-out decoder (for example decoders 414 and 424 of FIG. 4) and a hard decision portion (for example hard decision portion 418 and 428, respectively) with a soft-in hard-out, or SIHO, decoder. With three iterations of nonlinear compensation, the performance with hard decisions, as represented by function 514 suffers from 0.3 dB loss relative to using soft decisions, as represented by function 510 and then reaches the point of diminishing return more quickly.

For three iterations of nonlinear compensation and 40 decoding iterations, function 510 with soft decisions performs better than function 514 with hard decisions. Similarly, for two iterations on nonlinear compensation and 40 decoding iterations, function 512 with soft decisions performs better than function 516 with hard decisions.

FIG. 6 illustrates a graph 600 for BER performance of a family of multicarrier Volterra equalizers with signal to noise ratio/bit ($E_b/N_o$) for 32APSK modulation, in accordance with an aspect of the present invention.

Graph 600 includes the BER performance when the number of carriers is three, LDPC code rate is ¾ and the HPA is operated at aggregate OBO level of 2.6 dB. As illustrated in the figure, a y-axis 602 represents BER and an x-axis 604 represents signal to noise ratio/bit ($E_b/N_o$) in dB. Graph 600 includes a function 606, a function 608, a function 610, a function 612, a function 614, and a function 616.

FIG. 6 considers another special case of the turbo Volterra scheme that only incorporates, and hence mitigates, IMD generated within single carrier or nonlinear ISI. This is implemented by retaining the terms in the Volterra vector $\underline{h}_{m_d}^{(3)}(n)$ pertaining to the desired carrier as:

$$\underline{h}_{m_d}(n)=[\underline{\eta}_{m_d m_d}^{(1)}(n;3)^T \underline{\eta}_{m_d m_d m_d}^{(3)}(n;3)^T]^T, \quad (55)$$

whose size is 30×1. As illustrated in the figure, the difference in performance between single carrier and multicarrier versions is 2.62 dB and 1.77 dB without and with Turbo processing, respectively at BER of $2\times10^{-5}$. However, this degradation can be reduced to within 0.3 dB when using Turbo processing and incorporating the multicarrier IMD described herein, for example as represented by functions 608 and 610. The performance gap between single-carrier and multicarrier methods increases as the operating SNR level increases. This is explained further in view of the noiseless scattered eye diagrams of FIG. 7 as discussed below.

Figure 7:
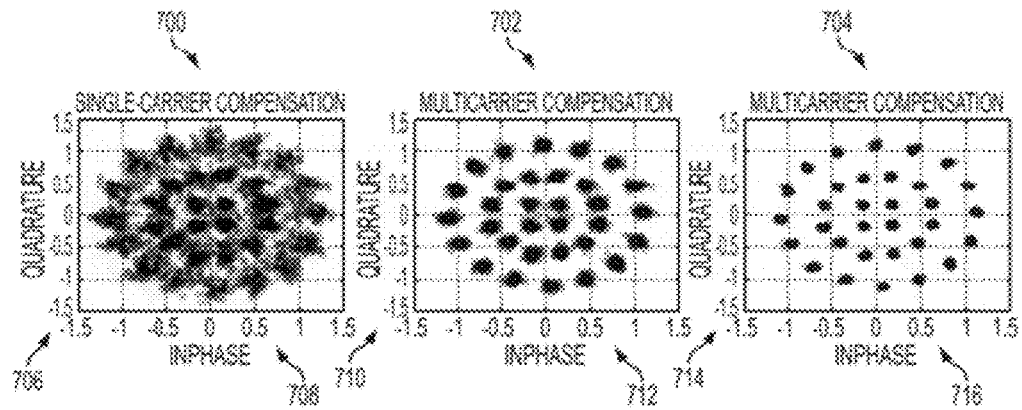
FIG. 7 illustrates noiseless scattered eye diagrams for single carrier and multicarrier compensation, in accordance with an aspect of the present invention.

FIG. 7 illustrates noiseless scattered eye diagrams for single carrier and multicarrier compensation, in accordance with an aspect of the present invention.

FIG. 7 illustrates noiseless scattered eye diagrams 700, 702 and 704 for center carrier when three carriers of LDPC-coded 32 APSK pass through nonlinear HPA at aggregate OBO of 2.6 dB for single carrier and multicarrier compensation solutions. Diagram 700 includes a y-axis 706 with quadrature phase and an x-axis 708 with inphase for single carrier compensation that mitigates only ISI. Diagram 702 includes a y-axis 710 with quadrature phase and an x-axis 712 with inphase for multicarrier compensation. Diagram 704 includes a y-axis 714 with quadrature phase and an x-axis 716 with inphase for multicarrier compensation. Diagram 702 includes the case of multicarrier compensation when incorporating IMD, which is frequency centered at zero, using carrier combinations from Table I. Diagram 704 includes the case of multicarrier compensation when incorporating IMD centered at zero and ±Δf, using carrier combinations from Table I and Table II.

It is obvious from diagram 700, there is irreducible clustering associated with single carrier compensation as it ignores interference from other carriers, a situation that cannot be improved with more iterations. This is in contrast with a large reduction in the clustering achieved by the multicarrier solution, as illustrated by diagram 702: more than 13 dB reduction in MSE of distortion. Also, the improvement provided by incorporating more carrier combinations in reconstructing IMD is noticeable in diagram 704.

Figure 8:
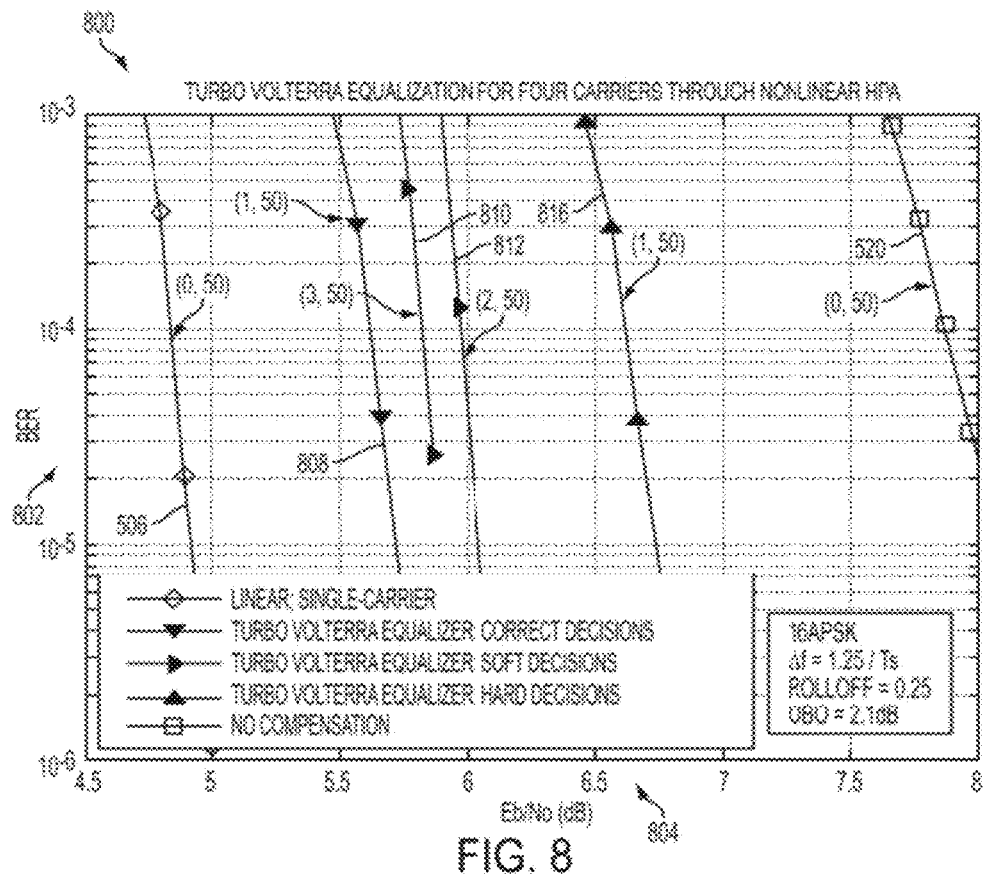
FIG. 8 illustrates a graph for BER performance of a family of multicarrier Volterra equalizers with signal to noise ratio/bit ($E_b/N_o$) for 16APSK modulation when four carriers pass through a common HPA, in accordance with an aspect of the present invention.

FIG. 8 illustrates a graph 800 for BER performance of a family of multicarrier Volterra equalizers with signal to noise ratio/bit ($E_b/N_o$), in accordance with an aspect of the present invention.

FIG. 8 includes the BER performance of a family of multicarrier Volterra equalizers for the center carrier when the number of carriers is four, modulation is 16 APSK, LDPC code rate is ⅔ and the HPA is operated at aggregate OBO level of 2.1 dB. As illustrated in the figure, a y-axis 802 represents BER and an x-axis 804 represents signal to noise ratio/bit ($E_b/N_o$) in dB. Graph 800 includes function 506, a function 808, a function 810, a function 812, a function 816 and function 520. The number of internal decoding iterations is chosen as 50.

FIG. 8 contains a pattern of results similar to FIG. 5 and FIG. 6. With only one iteration of nonlinear compensation, as represented by function 816, the performance is reasonable, suffering from 1 dB in performance degradation relative to the ideal case of correct decisions, as represented by function 808, at BER of $2\times10^{-5}$. When utilizing soft decisions from the bank of single carrier decoders, and with only three iterations of joint compensation and decoding, the performance approaches the ideal case to within 0.19 dB between function 810 and function 808. Function 506 represents BER performance for a single carrier.

As discussed with reference to FIGS. 2-8, a system and method to overcome IMD in multicarrier communication systems is proposed, which utilizes a turbo Volterra equalizer that is capable of reconstructing IMD, and then compensating for it using linear MMSE criterion. This was implemented by using a derived matrix-vector formulation, which applies Volterra based analytical characterization described earlier. This formulation is modular since only the modules pertaining to carrier combinations with significant contribution need to be retained. Also, the soft information about the code bits, supplied by a bank of single-carrier SISO FEC decoders, is incorporated through evaluating statistical averages of higher-order products of complex-valued symbols originating from multiple carriers.

The proposed multicarrier Volterra equalizer is adaptive as it utilizes estimates of the generalized Volterra kernels, obtained by RLS channel estimation at the end of pilot-based training. This allows for compensation that does not require prior knowledge of the HPA characteristics and can be rapidly responsive to variations in the environment. Through extensive simulations, it was shown that the proposed multicarrier analysis and turbo Volterra techniques can be used to substantially remove IMD which results when the nonlinear transponder HPA, shared by multiple carriers, is operated near saturation. By applying more iterations of joint equalization and decoding, the solution can approach the ideal performance when feeding back correct decisions.

The foregoing description of various preferred embodiments of the present invention have been presented for purposes of illustration and description. It is not intended to be exhaustive or to limit the present invention to the precise forms disclosed, and obviously many modifications and variations are possible in light of the above teaching. The example embodiments, as described above, were chosen and described in order to best explain the principles of the present invention and its practical application to thereby enable others skilled in the art to best utilize the present invention in various embodiments and with various modifications as are suited to the particular use contemplated. It is intended that the scope of the present invention be defined by the claims appended hereto.

The invention claimed is:

1. A receiver operable to receive a first signal transmitted on a first carrier and to receive a second signal transmitted on a second carrier, said receiver comprising:
 a channel estimation portion operable to output a first channel estimation based on the first signal and a second channel estimation based on the second signal;
 a multicarrier nonlinear equalizer operable to output a first equalized signal based on the first signal and the first channel estimation, and based on interference effects associated with one or more adjacent signals including the second signal, and a second equalized signal based on the second signal and the second channel estimation, and based on interference effects associated with one or more adjacent signals including the first signal;
 a first log likelihood ratio computing portion operable to output a first log likelihood ratio signal based on the first equalized signal;
 a second log likelihood ratio computing portion operable to output a second log likelihood ratio signal based on the second equalized signal;
 wherein said multicarrier nonlinear equalizer is further operable to output a third equalized signal based on the first signal, the first channel estimation and the first log likelihood ratio signal, and a fourth equalized signal based on the second signal, the second channel estimation and the second log likelihood ratio signal;
 wherein the first log likelihood ratio computing portion is further operable to output a third log likelihood ratio signal based on the third equalized signal and the first log likelihood ratio signal; and
 wherein the second log likelihood ratio computing portion is operable to output a fourth log likelihood ratio signal based on the fourth equalized signal and the second log likelihood ratio signal.

2. The receiver of claim 1, further comprising:
 a first deinterleaver operable to output a first deinterleaved signal based on the first log likelihood ratio signal; and
 a second deinterleaver operable to output a second deinterleaved signal based on the second log likelihood ratio signal.

3. The receiver of claim 2, further comprising:
 a first decoder operable to output a first decoded signal based on the first deinterleaved signal; and
 a second decoder operable to output a second decoded signal based on the second deinterleaved signal.

4. The receiver of claim 3, further comprising:
 a first interleaver operable to output a first interleaved signal based on the first decoded signal; and
 a second interleaver operable to output a second interleaved signal based on the second decoded signal.

5. The receiver of claim 4,
 wherein said first log likelihood ratio computing portion is operable to output the third log likelihood ratio signal based on the third equalized signal and the first decoded signal, and wherein said second log likelihood ratio computing portion is operable to output the fourth log likelihood ratio signal based on the fourth equalized signal and the second decoded signal.

6. The receiver of claim 3, wherein said first decoder comprises a soft-in soft-out decoder.

7. The receiver of claim 3, wherein said first decoder comprises a soft-in hard-out decoder.

8. The receiver of claim 1, wherein said first log likelihood ratio computing portion is operable to compute the first log likelihood ratio based on a conditional probability density function based on a Bivariate distribution.

9. The receiver of claim 1, wherein said multicarrier nonlinear equalizer comprises a multicarrier Volterra equalizer.

10. A method of receiving a first signal transmitted on a first carrier and a second signal transmitted on a second carrier, said method comprising:
outputting, via a channel estimation portion, a first channel estimation based on the first signal and a second channel estimation based on the second signal;
outputting, via a multicarrier nonlinear equalizer, a first equalized signal based on the first signal and the first channel estimation, and based on interference effects associated with one or more adjacent signals including the second signal, and a second equalized signal based on the second signal and the second channel estimation, and based on interference effects associated with one or more adjacent signals including the first signal;
outputting, via a first log likelihood ratio computing portion, a first log likelihood ratio signal based on the first equalized signal;
outputting, via a second log likelihood ratio computing portion, a second log likelihood ratio signal based on the second equalized signal;
outputting, via the multicarrier nonlinear equalizer, a third equalized signal based on the first signal, the first channel estimation and the first log likelihood ratio signal, and a fourth equalized signal based on the second signal, the second channel estimation and the second log likelihood ratio signal;
outputting, via the first log likelihood ratio computing portion, a third log likelihood ratio signal based on the third equalized signal and the first log likelihood ratio signal; and
outputting, via the second log likelihood ratio computing portion, a fourth log likelihood ratio signal based on the fourth equalized signal and the second log likelihood ratio signal.

11. The method of claim 10, further comprising:
outputting, via a first deinterleaver, a first deinterleaved signal based on the first log likelihood ratio signal; and
outputting, via a second deinterleaver, a second deinterleaved signal based on the second log likelihood ratio signal.

12. The method of claim 11, further comprising:
outputting, via a first decoder, a first decoded signal based on the first deinterleaved signal; and
outputting, via a second decoder, a second decoded signal based on the second deinterleaved signal.

13. The method of claim 12, further comprising:
outputting, via a first interleaver, a first interleaved signal based on the first decoded signal; and
outputting, via a second interleaver, a second interleaved signal based on the second decoded signal.

14. The method of claim 13,
wherein the third log likelihood ratio signal is based on the third equalized signal and the first decoded signal, and
wherein the fourth log likelihood ratio signal is based on the fourth equalized signal and the second decoded signal.

15. The method of claim 12, wherein the first decoded signal is output via a soft-in soft-out decoder.

16. The method of claim 12, wherein the first decoded signal is output via a soft-in hard-out decoder.

17. The method of claim 10, wherein the first log likelihood ratio signal is further based on a conditional probability density function based on a Bivariate distribution.

18. The method of claim 10, wherein the first equalized signal, the second equalized signal, the third equalized signal and the fourth equalized signal are output via a multicarrier Volterra equalizer.

* * * * *